United States Patent
Simon et al.

(10) Patent No.: US 12,411,505 B2
(45) Date of Patent: Sep. 9, 2025

(54) ADAPTIVE ACCELERATION FOR MATERIALS HANDLING VEHICLE

(71) Applicant: Crown Equipment Corporation, New Bremen, OH (US)

(72) Inventors: Andreas Simon, Munich (DE); Sebastian Theos, Vaterstetten (DE); Johannes Nachtigal, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/741,989

(22) Filed: Jun. 13, 2024

(65) Prior Publication Data

US 2024/0329671 A1 Oct. 3, 2024

Related U.S. Application Data

(63) Continuation of application No. 17/443,044, filed on Jul. 20, 2021, now Pat. No. 12,066,844.
(Continued)

(51) Int. Cl.
*G05D 13/62* (2006.01)
*B60K 31/00* (2006.01)
(Continued)

(52) U.S. Cl.
CPC ......... *G05D 13/62* (2013.01); *B60K 31/0058* (2013.01); *B62B 5/0069* (2013.01); *B66F 9/07572* (2013.01); *B66F 9/07581* (2013.01)

(58) Field of Classification Search
CPC .. G05D 1/0033; G05D 1/0061; G05D 1/0066; G05D 1/81; G05D 1/83;
(Continued)

(56) References Cited

U.S. PATENT DOCUMENTS

| 4,768,636 A | 9/1988 | Ito et al. |
| 4,942,529 A | 7/1990 | Avitan et al. |

(Continued)

FOREIGN PATENT DOCUMENTS

| CN | 101405176 A | 4/2009 |
| CN | 104067031 A | 9/2014 |

(Continued)

OTHER PUBLICATIONS

Verheul, Omiros; Extended European Search Report dated Nov. 28, 2024; European Application No. 24196012.9; European Patent Office; Munich, Germany.

(Continued)

*Primary Examiner* — Andrew Joseph Rudy
(74) *Attorney, Agent, or Firm* — Stevens & Showalter LLP

(57) ABSTRACT

A method is provided for operating a materials handling vehicle comprising: monitoring, by a processor, vehicle acceleration in a direction of travel of the vehicle during a manual operation by an operator of the vehicle when the vehicle is traveling in a first vehicle orientation; collecting and storing, by the processor, data related to the monitored vehicle acceleration; receiving, by the processor, a request to implement a semi-automated driving operation; calculating, by the processor, a maximum vehicle acceleration based on acceleration data comprising the stored data, wherein the data related to the monitored vehicle acceleration used in calculating the maximum vehicle acceleration comprises only the vehicle acceleration data in the direction of travel of the vehicle collected when the vehicle is traveling in the first vehicle orientation. Based at least in part on the maximum vehicle acceleration, controlling, by the processor, implementation of the semi-automated driving operation.

31 Claims, 16 Drawing Sheets

Related U.S. Application Data

(60) Provisional application No. 63/109,069, filed on Nov. 3, 2020.

(51) Int. Cl.
  *B62B 5/00* (2006.01)
  *B66F 9/075* (2006.01)

(58) Field of Classification Search
  CPC .. G05D 13/62; B60K 31/0058; B62B 5/0069; B66F 9/0755; B66F 9/07572; B66F 9/0753; B66F 9/07581; B66F 9/24; B66F 17/003
  USPC .......................................................... 701/93
  See application file for complete search history.

(56) References Cited

U.S. PATENT DOCUMENTS

| | | |
|---|---|---|
| 5,357,435 A | 10/1994 | Yasuda |
| 6,282,482 B1 | 8/2001 | Hedström |
| 7,017,689 B2 | 3/2006 | Gilliland et al. |
| 7,233,861 B2 | 6/2007 | Buer et al. |
| 7,240,757 B2 | 7/2007 | Ueda et al. |
| 7,302,338 B2 | 11/2007 | Petzold et al. |
| 7,475,753 B2 | 1/2009 | Oka et al. |
| 7,524,268 B2 | 4/2009 | Oka et al. |
| 7,568,547 B2 | 8/2009 | Yamada et al. |
| 7,693,641 B2 | 4/2010 | Maruki |
| 8,072,309 B2 | 12/2011 | Kraimer et al. |
| 8,392,049 B2 | 3/2013 | Goodwin et al. |
| 8,412,431 B2 | 4/2013 | Wetterer et al. |
| 8,589,012 B2 | 11/2013 | Wong et al. |
| 8,634,980 B1 | 1/2014 | Urmson et al. |
| 8,731,786 B2 | 5/2014 | Tueshaus |
| 8,751,095 B2 | 6/2014 | Goodwin et al. |
| 8,886,378 B2 | 11/2014 | Hammer et al. |
| 8,965,621 B1 | 2/2015 | Urmson et al. |
| 9,082,293 B2 | 7/2015 | Wellman et al. |
| 9,189,897 B1 | 11/2015 | Stenneth |
| 9,358,975 B1 | 6/2016 | Watts |
| 9,547,945 B2 | 1/2017 | McCabe et al. |
| 9,561,794 B2 | 2/2017 | Watts |
| 9,561,941 B1 | 2/2017 | Watts |
| 9,573,597 B2 | 2/2017 | Uno |
| 9,645,968 B2 | 5/2017 | Elston et al. |
| 9,650,233 B2 | 5/2017 | Medwin et al. |
| 9,718,661 B1 | 8/2017 | Hoffman |
| 9,779,059 B2 | 10/2017 | Kammerer et al. |
| 9,870,002 B1 | 1/2018 | Holmberg et al. |
| 10,119,272 B1 | 11/2018 | Shah et al. |
| 10,209,682 B1 | 2/2019 | Hebert et al. |
| 10,336,150 B1 | 7/2019 | Hebert et al. |
| 10,459,449 B2 | 10/2019 | Watts |
| 10,795,364 B1 | 10/2020 | Abeloe |
| 11,086,544 B2 | 8/2021 | Yun et al. |
| 11,126,178 B2 | 9/2021 | Akella et al. |
| 11,167,967 B2 | 11/2021 | Hoffman |
| 11,255,074 B2 | 2/2022 | Yamamoto et al. |
| 11,827,503 B2 | 11/2023 | Theos et al. |
| 11,827,505 B2 | 11/2023 | Tamanna et al. |
| 11,919,761 B2* | 3/2024 | Theos ............ G05D 1/0088 |
| 12,066,844 B2* | 8/2024 | Simon ............ B62B 5/0069 |
| 12,259,724 B2* | 3/2025 | Simon ............ G05D 1/0033 |
| 2007/0080025 A1 | 4/2007 | Yamada et al. |
| 2009/0132088 A1 | 5/2009 | Taitler |
| 2010/0198513 A1 | 8/2010 | Zeng et al. |
| 2010/0204891 A1 | 8/2010 | Biggerstaff |
| 2011/0046813 A1 | 2/2011 | Castaneda et al. |
| 2011/0106362 A1 | 5/2011 | Seitz |
| 2011/0137544 A1 | 6/2011 | Kawazu et al. |
| 2012/0123614 A1 | 5/2012 | Laws et al. |
| 2012/0277965 A1 | 11/2012 | Takahashi et al. |
| 2012/0310473 A1 | 12/2012 | Yoshii |
| 2013/0197715 A1 | 8/2013 | Otanez et al. |
| 2013/0197760 A1 | 8/2013 | Castaneda et al. |
| 2014/0305211 A1 | 10/2014 | Malvern et al. |
| 2015/0094928 A1 | 4/2015 | Matsumura |
| 2015/0149017 A1 | 5/2015 | Attard et al. |
| 2015/0149104 A1 | 5/2015 | Baker et al. |
| 2015/0166069 A1 | 6/2015 | Engelman et al. |
| 2015/0364021 A1 | 12/2015 | Ur |
| 2016/0023675 A1 | 1/2016 | Hannah et al. |
| 2016/0075339 A1 | 3/2016 | Versteyhe et al. |
| 2016/0078694 A1 | 3/2016 | Swift |
| 2016/0314428 A1 | 10/2016 | Sugaya |
| 2017/0123423 A1 | 5/2017 | Sako et al. |
| 2017/0174221 A1 | 6/2017 | Vaughn et al. |
| 2017/0212526 A1 | 7/2017 | Vanderpool et al. |
| 2017/0248965 A1 | 8/2017 | Wellman et al. |
| 2018/0002894 A1 | 1/2018 | Yamamoto et al. |
| 2018/0009643 A1 | 1/2018 | Hoffman |
| 2018/0113465 A1 | 4/2018 | Buss et al. |
| 2018/0118219 A1 | 5/2018 | Hiei et al. |
| 2018/0157036 A1 | 6/2018 | Choi et al. |
| 2018/0229988 A1 | 8/2018 | Gault et al. |
| 2018/0327184 A1 | 11/2018 | Sibley |
| 2018/0345984 A1 | 12/2018 | Lindelöf |
| 2018/0370780 A1 | 12/2018 | Marsee |
| 2019/0011918 A1 | 1/2019 | Son et al. |
| 2019/0056736 A1 | 2/2019 | Wood et al. |
| 2019/0137991 A1 | 5/2019 | Agarwal |
| 2019/0145860 A1 | 5/2019 | Phillips et al. |
| 2019/0184556 A1 | 6/2019 | Sinyavskiy et al. |
| 2019/0226178 A1 | 7/2019 | Nakano et al. |
| 2019/0263447 A1 | 8/2019 | Nakano et al. |
| 2019/0279493 A1 | 9/2019 | Kim et al. |
| 2019/0294175 A1 | 9/2019 | Pajevic et al. |
| 2019/0302794 A1 | 10/2019 | Kean et al. |
| 2019/0346862 A1 | 11/2019 | Switkes et al. |
| 2020/0012290 A1 | 1/2020 | Watts |
| 2020/0089241 A1 | 3/2020 | Kao et al. |
| 2020/0198699 A1 | 6/2020 | Lee |
| 2020/0394562 A1 | 12/2020 | Nonaka et al. |
| 2020/0409383 A1 | 12/2020 | Maunder |
| 2021/0064026 A1 | 3/2021 | Simon et al. |
| 2021/0087033 A1 | 3/2021 | Kimura et al. |
| 2021/0103278 A1 | 4/2021 | Yu et al. |
| 2021/0276843 A1 | 9/2021 | Garrison, III |
| 2021/0276844 A1 | 9/2021 | Garrison, III |
| 2021/0292145 A1 | 9/2021 | Theos et al. |
| 2021/0292146 A1 | 9/2021 | Theos et al. |
| 2022/0137651 A1 | 5/2022 | Simon et al. |
| 2022/0363528 A1 | 11/2022 | Okamoto et al. |

FOREIGN PATENT DOCUMENTS

| | | |
|---|---|---|
| CN | 104755339 A | 7/2015 |
| CN | 104915813 A | 9/2015 |
| CN | 105060177 A | 11/2015 |
| CN | 105735166 A | 7/2016 |
| CN | 106061817 A | 10/2016 |
| CN | 205740199 U | 11/2016 |
| CN | 107063239 A | 8/2017 |
| CN | 108216190 A | 6/2018 |
| CN | 109808703 A | 5/2019 |
| CN | 109911816 A | 6/2019 |
| CN | 109991982 A | 7/2019 |
| DE | 102014118079 A1 | 6/2015 |
| DE | 102015113445 A1 | 1/2017 |
| EP | 1770052 A2 | 4/2007 |
| EP | 1770053 A2 | 4/2007 |
| EP | 1770054 A2 | 4/2007 |
| EP | 1985576 A2 | 10/2008 |
| EP | 2279148 A2 | 2/2011 |
| EP | 2741268 A1 | 6/2014 |
| EP | 2886507 A1 | 6/2014 |
| EP | 2848484 A2 | 3/2015 |
| EP | 2860077 A2 | 4/2015 |
| EP | 3098194 A1 | 11/2016 |
| EP | 3118152 A1 | 1/2017 |
| EP | 3132682 A1 | 2/2017 |
| EP | 3498556 A1 | 6/2019 |
| EP | 3647136 A1 | 5/2020 |

(56) References Cited

FOREIGN PATENT DOCUMENTS

| JP | H01261200 A | 10/1989 |
|---|---|---|
| JP | H05180030 A | 7/1993 |
| JP | H07187323 A | 7/1995 |
| JP | H09218136 A | 8/1997 |
| JP | 2004352455 A | 12/2004 |
| WO | 2009129295 A2 | 10/2009 |
| WO | 2011002478 A2 | 1/2011 |
| WO | 2011059421 A1 | 5/2011 |
| WO | 2015166811 A1 | 11/2015 |
| WO | 2017105755 A1 | 6/2017 |
| WO | 2018048641 A1 | 3/2018 |
| WO | 2019183580 A1 | 9/2019 |

OTHER PUBLICATIONS

Andreas Simon et al.; U.S. Appl. No. 18/935,799 entitled "Adaptive Acceleration for Semi-Automated Driving Operation of a Materials Handling Vehicle"; Nov. 4, 2024; United States Patent and Trademark Office; Alexandria, Virginia.
Baajour, Shahira; Notice of Allowance and Fees Due dated Nov. 7, 2024; U.S. Appl. No. 16/943,567; United States Patent and Trademark Office; Alexandria, Virginia.
Bochao, Li; Chinese Procedure Notice with Notice to Grant dated Dec. 18, 2024; Chinese Application No. 202180006985.7; China National Intellectual Property Administration; Beijing, China.
Wang, Wei; Notification of the First Office Action dated Dec. 5, 2024; Chinese Application No. 202180006826.7; China National Intellectual Property Administration; Beijing, China.
U.S. Patent Application dated Mar. 15, 2021 entitled "Adaptive Acceleration for Materials Handling Vehicle"; U.S. Appl. No. 17/249,798; United States Patent and Trademark Office; Alexandria, Virginia.
U.S. Patent Application dated Mar. 15, 2021 entitled "Based on Detected Start of Picking Operation, Resetting Stored Data Related to Monitored Drive Parameter"; U.S. Appl. No. 17/249,799; United States Patent and Trademark Office; Alexandria, Virginia.
International Search Report and Written Opinion of the International Searching Authority dated Nov. 12, 2020; International Application No. PCT/US020/044262; European Patent Office; Rijswijk, Netherlands.
International Preliminary Report on Patentability dated Mar. 1, 2022; International Application No. PCT/US2020/044262; The International Bureau of WIPO; Geneva, Switzerland.
International Preliminary Report on Patentability dated May 8, 2023; International Application No. PCT/US2021/042306; The International Bureau of WIPO; Geneva, Switzerland.
International Search Report and Written Opinion of the International Searching Authority dated Jun. 1, 2021; International Application No. PCT/US2021/022279; European Patent Office; Rijswijk, Netherlands.
International Preliminary Report on Patentability dated May 9, 2022; International Application No. PCT/US2021/022279; European Patent Office; Rijswijk, Netherlands.
International Search Report and Written Opinion of the International Searching Authority dated Jul. 12, 2021; International Application No. PCT/US2021/022281; European Patent Office; Rijswijk, Netherlands.
International Preliminary Report on Patentability dated Sep. 20, 2022; International Application No. PCT/US2021/022281; The International Bureau of WIPO; Geneva, Switzerland.
International Search Report and Written Opinion of the International Searching Authority dated Oct. 20, 2021; (International Application No. PCT/US2021/042306; European Patent Office; Rijswijk, Netherlands.
Written Opinion of the International Preliminary Examining Authority dated Feb. 14, 2022; International Application No. PCT/US2021/022279; European Patent Office; Munich, Germany.
Al-Shihabi, Talal article dated Jan. 1, 2003; "Toward More Realistic Driving Behavior Models for Autonomous Vehicles in Driving Simulators"; Transportation Research Record; Journal of the Transportation Research Board; vol. 1843; Issue 1; pp. 41-49.
Calabrese, Marco et al. article dated Sep. 2008; "Experimental System to Support Real-Time Driving Pattern Recognition"; Advanced Intelligent Computing Theories and Applications With Aspects of Artificial Intelligence; pp. 1192-1199.
Kohlmeyer, Rolf R.; article dated Nov. 2011 entitled "Modelling and Control of an Articulated Underground Mining Vehicle"; University of Pretoria; Pretoria, S. Africa.
Election/Restriction dated Jun. 20, 2022; U.S. Appl. No. 16/943,567; United States Patent and Trademark Office; Alexandria, Virginia.
Office Action dated Sep. 14, 2022; U.S. Appl. No. 16/943,567; United States Patent and Trademark Office; Alexandria, Virginia.
Office Action dated Sep. 14, 2022; U.S. Appl. No. 17/249,798; United States Patent and Trademark Office; Alexandria, Virginia.
Office Action dated Dec. 20, 2022; U.S. Appl. No. 16/943,567; United States Patent and Trademark Office; Alexandria, Virginia.
Baajour, Shahira; Non-Final Office Action, dated Jul. 6, 2023; U.S. Appl. No. 16/943,567; United States Patent and Trademark Office; Alexandria, Virginia.
Office Action dated Jan. 10, 2023; U.S. Appl. No. 17/249,798; United States Patent and Trademark Office; Alexandria, Virginia.
Ho, Matthew; Office Action; U.S. Appl. No. 17/249,798; May 11, 2023; United States Patent and Trademark Office; Alexandria, Virginia.
Dominick Anthony Chir Mulder; Office Action; U.S. Appl. No. 17/249,799; Mar. 13, 2023; United States Patent and Trademark Office; Alexandria, Virginia.
Mulder, Dominick Anthony Chir; Final Office Action dated Sep. 12, 2023; U.S. Appl. No. 17/249,799; United States Patent and Trademark Office; Alexandria, Virginia.
Mulder, Dominick Anthony Chir; Notice of Allowance dated Nov. 20, 2023; U.S. Appl. No. 17/249,799; USPTO; Alexandria, Virginia.
Deng Congyao; Office Action; Chinese Application No. 202080060160.9; Feb. 23, 2023; CNIPA; Beijing, China.
Congyao, Deng; Notice of Allowance dated Sep. 27, 2023; Chinese Application No. 202080060160.9; China National Intellectual Administration; Beijing, China.
Bochao, Li; Office Action No. 1 dated Dec. 19, 2023; Chinese Application No. 202180006985.7; National Intellectual Property Administration; Beijing, China.
Li Bochao; Office Action; Chinese Patent Application No. 202180006985.7; Jun. 21, 2024; China National Intellectual Property Administration; Beijing, China.
Szpaizer, Ana; Official Action dated Sep. 8, 2023; Canadian Application No. 3,163,201; CIPO; Quebec, Canada.
Gardiner, David; Office Action dated Oct. 17, 2023; Canadian Application No. 3161726; CIPO; Quebec, Canada.
Breton, David; Office Action dated Oct. 27, 2023; Canadian Application No. 3147988; CIPO; Quebec, Canada.
Simon, Andreas; Related Divisional U.S. Appl. No. 18/522,971 entitled "Adaptive Acceleration for Materials Handling Vehicle" filed Nov. 29, 2023; United States Patent and Trademark Office; Alexandria, Virginia.
Simon, Andreas; U.S. Appl. No. 16/943,567 entitled "Adaptive Acceleration for Materials Handling Vehicle"; filed Jul. 30, 2020; United States Patent and Trademark Office; Alexandria, Virginia.
Simon, Andreas; U.S. Appl. No. 17/442,044 entitled "Adaptive Acceleration for Materials Handling Vehicle"; filed Jul. 20, 2021; United States Patent and Trademark Office; Alexandria, Virginia.
Rudy, Andrew J.; Non-Final Office Action dated Dec. 5, 2023; U.S. Appl. No. 17/443,044; United States Patent and Trademark Office; Alexandria, Virginia.
Rudy, Andrew J.; Notice of Allowance and Fees Due dated Apr. 9, 2024; U.S. Appl. No. 17/443,044; United States Patent and Trademark Office; Alexandria, Virginia.
Baajour, Shahira; Non-Final Rejection dated Feb. 9, 2024; U.S. Appl. No. 16/943,567; United States Patent and Trademark Office; Alexandria, Virginia.
Verheul, Omiros; Communication Pursuant to Article 94(3) EPC dated Jan. 23, 2024; European Patent Application No. 20758021.8; European Patent Office; Rijswijk, Netherlands.

(56) References Cited

OTHER PUBLICATIONS

Lalinde Araguas, Rafael; Communication Pursuant to Article 94(3) EPC dated Mar. 4, 2024; European Application No. 21715460.8; European Patent Office; Munich, Germany.

Baajour, Shahira; Non-Final Rejection dated Jul. 18, 2024; U.S. Appl. No. 18/522,971; United States Patent and Trademark Office; Alexandria, Virginia.

Baajour, Shahira; Final Office Action dated Feb. 3, 2025; U.S. Appl. No. 18/522,971; United States Patent and Trademark Office; Alexandria, Virginia.

Baajour, Shahira; Final Office Action dated Jul. 26, 2024; U.S. Appl. No. 16/943,567; United States Patent and Trademark Office; Alexandria, Virginia.

Breton, Antoine; Requisition By the Examiner dated Dec. 17, 2024; Canadian Application No. 3,147,988; Canadian Intellectual Property Office; Quebec, Canada.

Lalinde Araguas, Rafael; Communication pursuant to Article 94(3) EPC dated Nov. 8, 2024; European Application No. 21715460.8; European Patent Office; Munich, Germany.

Jeong, Heon-Joo; Notice of Preliminary Rejection dated Mar. 27, 2025; Korean Application No. 10-2022-7034813; Korean Intellectual Property Office; Location?

Laracilla, Edgar Flores; Office Action date Mar. 14, 2025; Mexican Application No. MX/a/2022/006498; Mexican Institute of the Industrial Property; Mexico City, Mexico.

Lalinde Araguas, Rafael; First Examination Report dated May 8, 2025; European Application No. 21715460.8; European Patent Office; Munich, Germany.

Farooji, Vahid Etminan; Examination Report No. 1 dated May 12, 2025; Australian Application No. 2020336166; IP Australia; Canberra, Australia.

Han Seong-Ho; Notice of Submission of Opinion dated Aug. 1, 2025; Korean Application No. 10-2022-7006806; Korean Intellectual Property Office; Daejeon, South Korea.

\* cited by examiner

| Time increment | Acceleration values manual mode $a_x$ in (m/s²) | Time increment | Acceleration values manual mode $a_x$ in (m/s²) | Time increment | Acceleration values manual mode $a_x$ in (m/s²) |
|---|---|---|---|---|---|
| 1 | 1 | 10 | 0 | 19 | 6 |
| 2 | 2 | 11 | 5 | 20 | 6 |
| 3 | 4 | 12 | 4 | 21 | 1 |
| 4 | 8 | 13 | 2 | 22 | 2 |
| 5 | 3 | 14 | 1 | 23 | 5 |
| 6 | 2 | 15 | 1 | 24 | 5 |
| 7 | 1 | 16 | 3 | 25 | 3 |
| 8 | 0 | 17 | 4 | 26 | 2 |
| 9 | 0 | 18 | 5 | 27 | 1 |

Table 1

FIG. 5

| (Weighted) average | wa$_{x-1}$ start value | wa$_{x-2}$ | wa$_{x-3}$ | wa$_{x-4}$ | wa$_{x-5}$ | wa$_{x-6}$ | wa$_{x-7}$ | wa$_{x-8}$ | wa$_{x-9}$ |
|---|---|---|---|---|---|---|---|---|---|
| Result [m/s$^2$] | 2.33 | 3.33 | 1.83 | 2.42 | 1.87 | 2.94 | 3.64 | 3.82 | 2.91 |

Table 2

| Acceleration y-direction | a$_{y-1}$ | a$_{y-2}$ | a$_{y-3}$ | a$_{y-4}$ | a$_{y-5}$ | a$_{y-6}$ | a$_{y-7}$ | a$_{y-8}$ | a$_{y-9}$ |
|---|---|---|---|---|---|---|---|---|---|
| Result [m/s$^2$] | 0.25 | 0.49 | 0.52 | 0.54 | 0.75 | 0.72 | 0.60 | 0.39 | 0 |

Table 3

| (Weighted) average | wa$_{y\text{-}1}$ start value | wa$_{y\text{-}2}$ | wa$_{y\text{-}3}$ |
|---|---|---|---|
| Result [m/s$^2$] | 0.42 | 0.55 | 0.44 |

Table 4

| Categorization ranges for filtered, max. acceleration in y-direction [m/s$^2$] | Rating | Correction factor corr$_y$ |
|---|---|---|
| 0.50 - 0.75 | High acceleration | +10% |
| 0.25 - 0.49 | Medium acceleration | 0% - no correction |
| 0.00 - 0.24 | Low acceleration | -10% |

Lookup Table

ADAPTIVE ACCELERATION FOR MATERIALS HANDLING VEHICLE

RELATED APPLICATIONS

This application is a continuation of U.S. patent application Ser. No. 17/443,044, filed Jul. 20, 2021, entitled "ADAPTIVE ACCELERATION FOR MATERIALS HANDLING VEHICLE," which claims the benefit of U.S. Provisional Application No. 63/109,069, filed Nov. 3, 2020, entitled "ADAPTIVE ACCELERATION FOR MATERIALS HANDLING VEHICLE," both of which are hereby incorporated by reference in their entirety.

BACKGROUND

Materials handling vehicles are commonly used for picking stock in warehouses and distribution centers. Such vehicles typically include a power unit and a load handling assembly, which may include load carrying forks. The vehicle also has control structures for controlling operation and movement of the vehicle.

In a typical stock picking operation, an operator fills orders from available stock items that are located in storage areas provided along one or more aisles of a warehouse or distribution center. The operator drives the vehicle between various pick locations where item(s) are to be picked. The operator may drive the vehicle either by using the control structures on the vehicle, or via a wireless remote control device that is associated with the vehicle.

BRIEF SUMMARY

In accordance with a first aspect, a method is provided for operating a materials handling vehicle comprising: monitoring, by a processor, vehicle acceleration in a direction of travel of the vehicle during a manual operation by an operator of the vehicle when the vehicle is traveling in a first vehicle orientation; collecting and storing, by the processor, data related to the monitored vehicle acceleration in the direction of travel of the vehicle comprising data related to the monitored vehicle acceleration when the vehicle is traveling in the first vehicle orientation during the manual operation; receiving, by the processor, a request to implement a semi-automated driving operation; calculating, by the processor, a maximum vehicle acceleration based on acceleration data comprising the stored data, wherein the data related to the monitored vehicle acceleration in the direction of travel of the vehicle used in calculating the maximum vehicle acceleration comprises only the vehicle acceleration data in the direction of travel of the vehicle collected when the vehicle is traveling in the first vehicle orientation. Based at least in part on the maximum vehicle acceleration, controlling, by the processor, implementation of the semi-automated driving operation.

Vehicle acceleration data in the direction of travel of the vehicle corresponding to when the vehicle is traveling in a second vehicle orientation, which is substantially 180 degrees different from the first vehicle orientation, may not be used by the processor when calculating the maximum acceleration.

The vehicle may comprise a load handling assembly comprising at least one fork and a load support extending generally transverse to the at least one fork. The load support may be adapted to support a load carried by the at least one fork when the vehicle is accelerating while traveling in a second orientation and decelerating while traveling in the first orientation, wherein the second orientation may be substantially 180 degrees different than the first orientation.

The materials handling vehicle may comprise a load handling assembly and a power unit, the first orientation comprises a power unit first direction.

The method may further comprise: detecting, by the processor, operation of the vehicle indicative of a start of a pick operation occurring during the manual operation of the vehicle; and based on detecting the start of the pick operation, resetting, by the processor, the stored data related to the monitored vehicle acceleration. Preferably, the maximum vehicle acceleration is calculated by the processor based only on the acceleration data collected and stored after the resetting by the processor.

In accordance with a second aspect, a method is provided for operating a materials handling vehicle comprising: monitoring, by a processor, vehicle acceleration in a direction of travel of the vehicle during a manual operation by an operator of the vehicle when traveling in a first vehicle orientation; monitoring, by the processor, vehicle deceleration in the direction of travel of the vehicle during the manual operation by the operator of the vehicle when traveling in a second vehicle orientation; collecting and storing, by the processor, first data related to the monitored vehicle acceleration in the direction of travel of the vehicle comprising data related to the monitored vehicle acceleration when the vehicle is traveling in the first vehicle orientation and second data related to the monitored vehicle deceleration in the direction of travel of the vehicle comprising data related to the monitored vehicle deceleration when the vehicle is traveling in the second vehicle orientation; receiving, by the processor, a request to implement a semi-automated driving operation; and calculating, by the processor, a maximum vehicle acceleration based on the stored first and second data, wherein the first data related to the monitored vehicle acceleration in the direction of travel of the vehicle used in calculating the maximum vehicle acceleration comprises only the vehicle acceleration data in the direction of travel of the vehicle collected when the vehicle is traveling in the first vehicle orientation and wherein the second data related to the monitored vehicle deceleration in the direction of travel of the vehicle used in calculating the maximum vehicle acceleration comprises only the vehicle deceleration data collected in the direction of travel of the vehicle when the vehicle is traveling in the second vehicle orientation. Based at least in part on the maximum vehicle acceleration, controlling, by the processor, implementation of the semi-automated driving operation.

Vehicle acceleration data in the direction of travel of the vehicle corresponding to when the vehicle is traveling in the second vehicle orientation may not be used by the processor when calculating the maximum acceleration. Vehicle deceleration data in the direction of travel of the vehicle corresponding to when the vehicle is traveling in the first vehicle orientation may not be used by the processor when calculating the maximum acceleration.

The vehicle may comprise a load handling assembly comprising at least one fork and a load support extending generally transverse to the at least one fork, wherein the load support is adapted to support a load carried by the at least one fork when the vehicle is accelerating while traveling in a second orientation and decelerating while traveling in the first orientation, wherein the second vehicle orientation is substantially 180 degrees different than the first vehicle orientation.

The materials handling vehicle may comprise a load handling assembly and a power unit, the first vehicle orientation may comprise a power unit first direction and the second vehicle orientation may comprise a load handling assembly first direction.

The method may further comprise: detecting, by the processor, operation of the vehicle indicative of a start of a pick operation occurring during the manual operation of the vehicle; and based on detecting the start of the pick operation, resetting, by the processor, the stored first and second data related to the monitored vehicle acceleration and deceleration.

The maximum vehicle acceleration may be calculated by the processor based only on the first and second data stored after the resetting by the processor.

In accordance with a third aspect, a system is provided for operating a materials handling vehicle comprising: a memory storing executable instructions; and a processor in communication with the memory. Execution of the executable instructions by the processor may cause the processor to: monitor vehicle acceleration in a direction of travel of the vehicle during a manual operation by an operator of the vehicle when the vehicle is traveling in a first orientation; collect and store data related to the monitored vehicle acceleration in the direction of travel of the vehicle comprising data related to the monitored vehicle acceleration when the vehicle is traveling in the first vehicle orientation during the manual operation; receive a request to implement a semi-automated driving operation; calculate a maximum vehicle acceleration based on acceleration data comprising the stored data, wherein the data related to the monitored vehicle acceleration in the direction of travel of the vehicle used in calculating the maximum vehicle acceleration comprises only the vehicle acceleration data in the direction of travel of the vehicle collected when the vehicle is traveling in the first vehicle orientation; and control implementation of the semi-automated driving operation based at least in part on the maximum vehicle acceleration.

Vehicle acceleration data in the direction of travel of the vehicle corresponding to when the vehicle is traveling in a second vehicle orientation, which is substantially 180 degrees different from the first vehicle orientation, may not be used by the processor when calculating the maximum acceleration.

The vehicle may comprise a load handling assembly comprising at least one fork and a load support extending generally transverse to the at least one fork. The load support may be adapted to support a load carried by the at least one fork when the vehicle is accelerating while traveling in a second vehicle orientation and decelerating while traveling in the first orientation, wherein the second vehicle orientation may be substantially 180 degrees different than the first vehicle orientation.

The materials handling vehicle may comprise a load handling assembly and a power unit.

The first vehicle orientation may comprise a power unit first direction.

Execution of the executable instructions by the processor may cause the processor to: detect operation of the vehicle indicative of a start of a pick operation occurring during the manual operation of the vehicle; and reset the stored data related to the monitored vehicle acceleration based on detecting the start of the pick operation.

Execution of the executable instructions by the processor may cause the processor to calculate the maximum vehicle acceleration based only on the acceleration data stored after the resetting of the stored data.

Execution of the executable instructions by the processor may cause the processor to: monitor vehicle acceleration along a transverse direction to the direction of travel of the vehicle during the manual operation of the vehicle and collect and store data related to the monitored vehicle acceleration in the transverse direction. When calculating the maximum vehicle acceleration, the data related to the monitored vehicle acceleration in the transverse direction may be used.

The vehicle acceleration along the transverse direction may be monitored when the vehicle is traveling in the first orientation, a second vehicle orientation, which is substantially 180 degrees different from the first vehicle orientation, or both the first and second orientations.

In accordance with a fourth aspect, a system is provided for operating a materials handling vehicle comprising: a memory storing executable instructions; and a processor in communication with the memory. Execution of the executable instructions by the processor may cause the processor to: monitor vehicle acceleration in a direction of travel of the vehicle during a manual operation by an operator of the vehicle when traveling in a first vehicle orientation; monitor vehicle deceleration in the direction of travel of the vehicle during the manual operation by the operator of the vehicle when traveling in a second vehicle orientation; collect and store first data related to the monitored vehicle acceleration in the direction of travel of the vehicle comprising data related to the monitored vehicle acceleration when the vehicle is traveling in the first vehicle orientation and second data related to the monitored vehicle deceleration in the direction of travel of the vehicle comprising data related to the monitored vehicle deceleration when the vehicle is traveling in the second vehicle orientation; receive a request to implement a semi-automated driving operation; calculate a maximum vehicle acceleration based on the stored first and second data, wherein the first data related to the monitored vehicle acceleration in the direction of travel of the vehicle used in calculating the maximum vehicle acceleration comprises only the vehicle acceleration data collected when the vehicle is traveling in the first vehicle orientation and wherein the second data related to the monitored vehicle deceleration in the direction of travel of the vehicle used in calculating the maximum vehicle acceleration comprises only the vehicle deceleration data collected when the vehicle is traveling in the second vehicle orientation; and control implementation of the semi-automated driving operation based at least in part on the maximum vehicle acceleration.

Vehicle acceleration data in the direction of travel of the vehicle corresponding to when the vehicle is traveling in the second vehicle orientation may not be used by the processor when calculating the maximum acceleration.

Vehicle deceleration data in the direction of travel of the vehicle corresponding to when the vehicle is traveling in the first vehicle orientation may not be used by the processor when calculating the maximum acceleration.

The vehicle may comprise a load handling assembly comprising at least one fork and a load support extending generally transverse to the at least one fork, wherein the load support may be adapted to support a load carried by the at least one fork when the vehicle is accelerating while traveling in a second orientation and decelerating while traveling in the first orientation, wherein the second vehicle orientation is substantially 180 degrees different than the first vehicle orientation.

The materials handling vehicle may comprise a load handling assembly and a power unit.

The first vehicle orientation may comprise a power unit first direction and the second vehicle orientation may comprise a load handling assembly first direction.

Execution of the executable instructions by the processor may cause the processor to: detect operation of the vehicle indicative of a start of a pick operation occurring during the manual operation of the vehicle; and based on detecting the start of the pick operation, resetting the stored first and second data related to the monitored vehicle acceleration.

The maximum vehicle acceleration may be calculated by the processor based only on the first and second data stored after the resetting by the processor.

BRIEF DESCRIPTION OF THE SEVERAL VIEWS OF THE DRAWINGS

FIG. 5 illustrates a table containing non-real sample acceleration values in the first direction corresponding to a most recent manual operation of the vehicle according to one or more embodiments shown and described herein;

DETAILED DESCRIPTION

In the following detailed description of the illustrated embodiments, reference is made to the accompanying drawings that form a part hereof, and in which is shown by way of illustration, and not by way of limitation. It is to be understood that other embodiments may be utilized and that changes may be made without departing from the spirit and scope of various embodiments illustrated herein.

Low Level Order Picking Truck

Figure 1A:
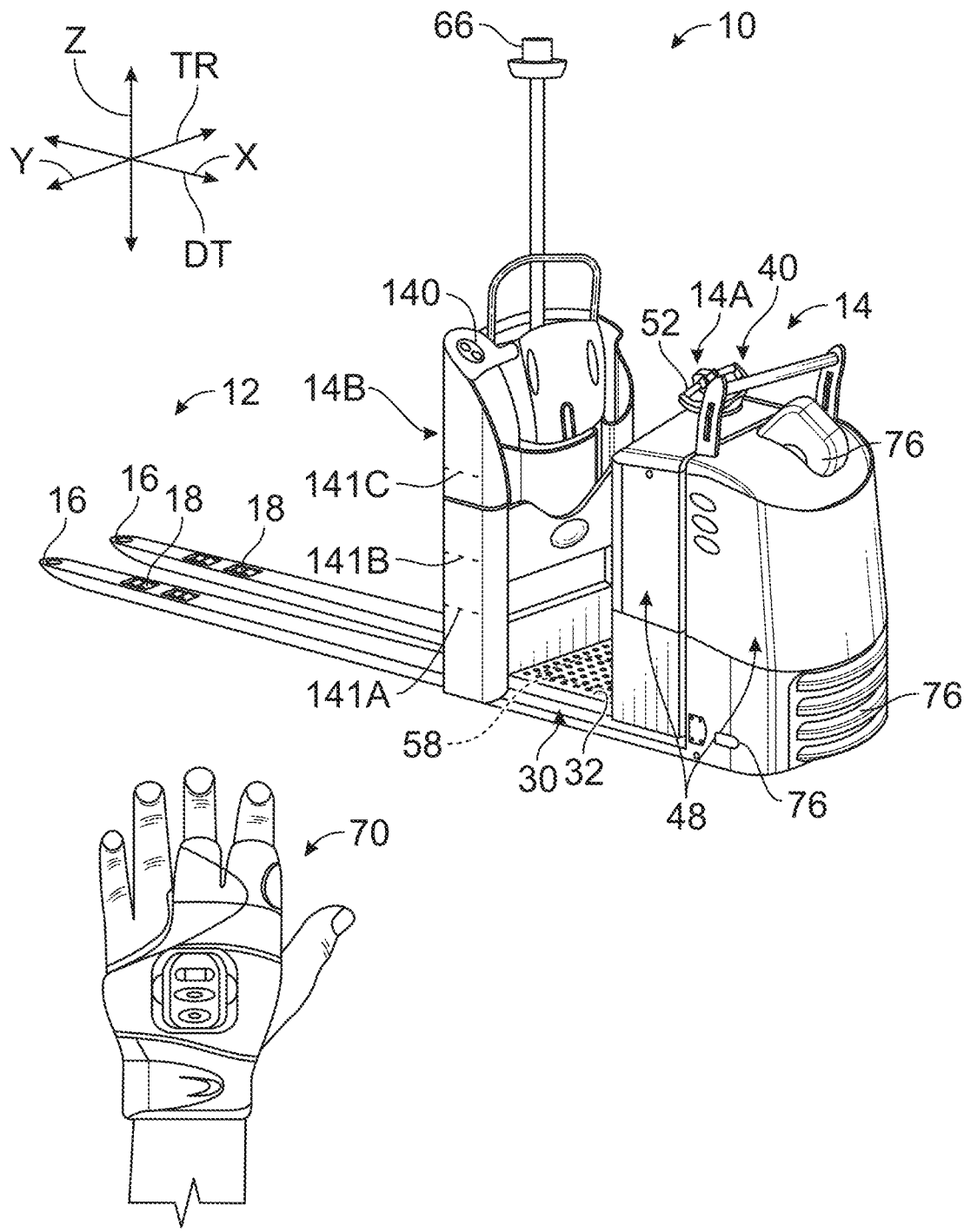
FIGS. 1A-1C are illustrations of a materials handling vehicle capable of remote wireless operation according to one or more embodiments shown and described herein.
Figure 1B:
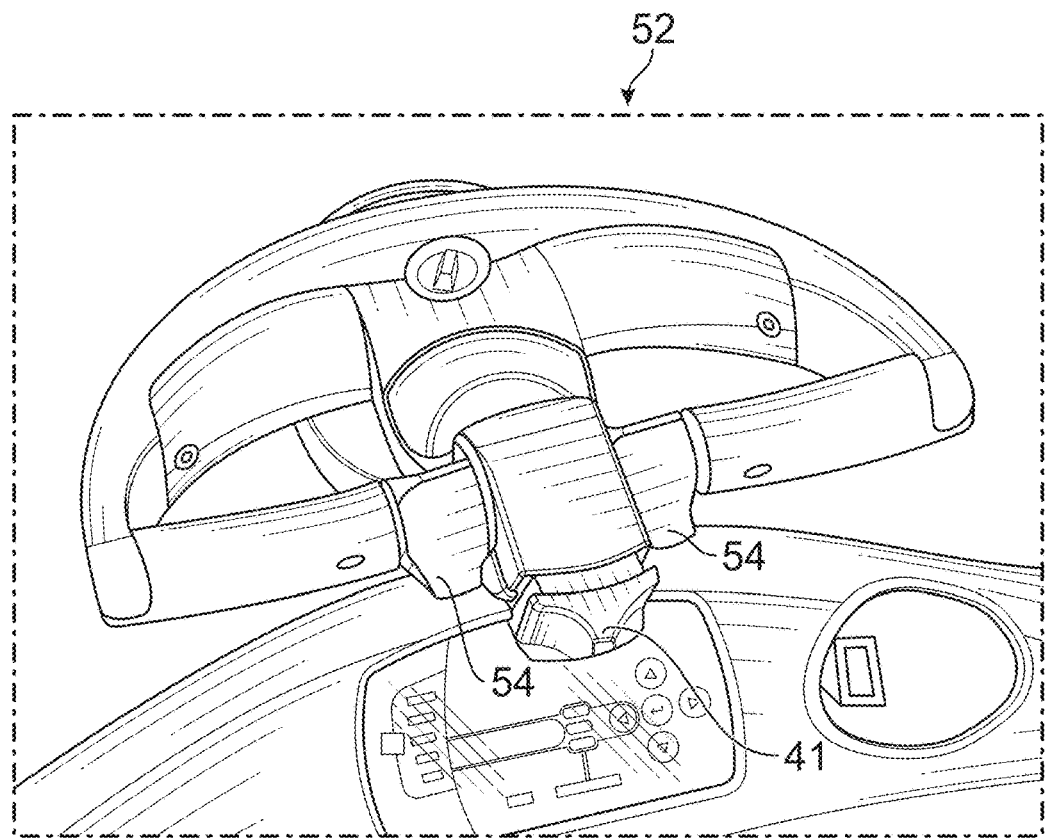
Figure 1C:
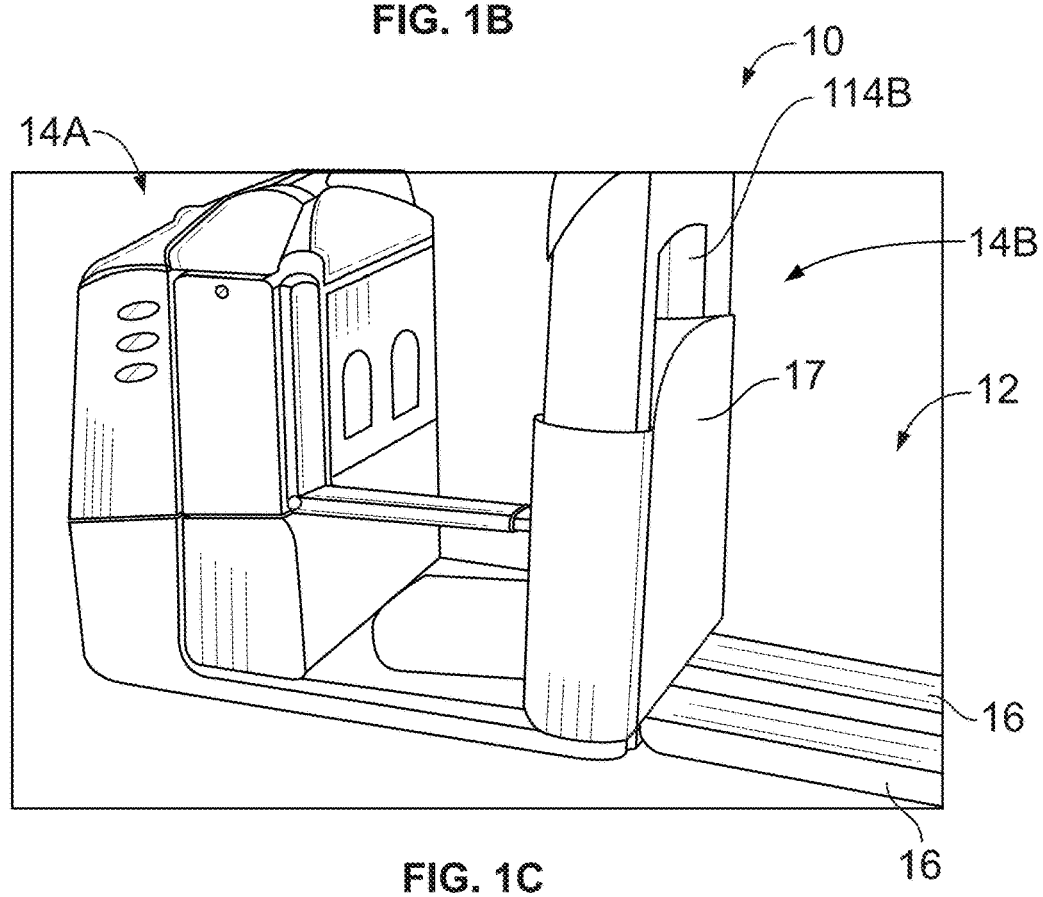

Referring now to the drawings, and particularly to FIGS. 1A, 1B and 1C, a materials handling vehicle, which is illustrated as a low level order picking truck 10, includes in general a load handling assembly 12 that extends from a power unit 14. The load handling assembly 12 includes a pair of forks 16, each fork 16 having a load supporting wheel assembly 18, and a vertical back cover 17 located at a base of the forks 16 near the power unit 14, which may define a load support. The load handling assembly 12 may include other load handling features in addition to, or in lieu of the illustrated arrangement of the forks 16, such as a scissors-type elevating forks, outriggers or separate height adjustable forks. Still further, the load handling assembly 12 may include load handling features such as a mast, a load platform, collection cage or other support structure carried by the forks 16 or otherwise provided for handling a load supported and carried by the truck 10 or pushed or pulled by the truck, i.e., such as by a tugger vehicle.

The illustrated power unit 14 comprises a step-through operator's station 30 dividing a first end section 14A of the power unit 14 (opposite the forks 16) from a second end section 14B (proximate the forks 16). The step-through operator's station 30 provides a platform 32 upon which an operator may stand to drive the truck 10 and/or to provide a position from which the operator may operate the various included features of the truck 10.

A first work area is provided towards the first end section 14A of the power unit 14 and includes a control area 40 for driving the truck 10 when the operator is standing on the platform 32 and for controlling the features of the load handling assembly 12. The first end section 14A defines a compartment 48 for containing a battery, control electronics, including a controller 103 (see FIG. 2), and motor(s), such as a traction motor, steer motor and lift motor for the forks (not shown).

As shown for purposes of illustration, and not by way of limitation, the control area 40 comprises a handle 52 for steering the truck 10, which may include controls such as grips, butterfly switches, thumbwheels, rocker switches, a hand wheel, a steering tiller, etc., for controlling the acceleration/braking and travel direction of the truck 10, see FIGS. 1A and 1B. For example, as shown, a control such as a switch grip or travel switch 54 may be provided on the handle 52, which is spring biased to a center neutral position. Rotating the travel switch 54 forward and upward will cause the truck 10 to move forward, e.g., power unit first, at an acceleration proportional to the amount of rotation of the travel switch 54 until the truck 10 reaches a predefined maximum speed, at which point the truck 10 is no longer permitted to accelerate to a higher speed. For example, if the travel switch 54 is very quickly rotated 50% of a maximum angle of rotation capable for the grip 54, the truck 10 will accelerate at approximately 50% of the maximum acceleration capable for the truck until the truck reaches 50% of the maximum speed capable for the truck. It is also contemplated that acceleration may be determined using an acceleration map stored in memory where the rotation angle of the grip 54 is used as an input into and has a corresponding acceleration value in the acceleration map. The acceleration values in the acceleration map corresponding to the grip rotation angles may be proportional to the grip rotation angles or vary in any desired manner. There may also be a velocity map stored in memory where the rotation angle of the grip 54 is used as an input into and has a corresponding maximum velocity value stored in the velocity map. For example, when the grip 54 is rotated 50% of the maximum angle capable for the grip 54, the truck will accelerate at a corresponding acceleration value stored in the acceleration map to a maximum velocity value stored in the velocity map corresponding to the grip angle of 50% of the maximum angle. Similarly, rotating the travel switch 54 toward the rear and downward of the truck 10 will cause the truck 10 to move in reverse, e.g., forks first, at an acceleration proportional to the amount of rotation of the travel switch 54 until the truck 10 reaches a predefined maximum speed corresponding to the amount of rotation of the travel switch 54, at which point the truck 10 is no longer permitted to accelerate to a higher speed.

Presence sensors 58 may be provided to detect the presence of an operator on the truck 10. For example, presence sensors 58 may be located on, above or under the platform floor, or otherwise provided about the operator's station 30. In the exemplary truck 10 of FIG. 1A, the presence sensors 58 are shown in dashed lines indicating that they are positioned under the platform floor. Under this arrangement, the presence sensors 58 may comprise load sensors, switches, etc. As an alternative, the presence sensors 58 may be implemented above the platform floor, such as by using ultrasonic, capacitive, laser scanner, camera or other suitable sensing technology. The utilization of presence sensors 58 will be described in greater detail herein.

An antenna 66 extends vertically from the power unit 14 and is provided for receiving control signals from a corresponding wireless remote control device 70. It is also contemplated that the antenna 66 may be provided within the compartment 48 of the power unit 14 or elsewhere on the truck 10. According to one embodiment, the truck 10 may include a pole (not shown) that extends vertically from the power unit 14 and includes an antenna 66 that is provided for receiving control signals from a corresponding wireless remote control device 70. The pole may include a light at the top, such that the pole and light define a light tower. The remote control device 70 may comprise a transmitter that is worn or otherwise maintained by the operator. The remote control device 70 is manually operable by an operator, e.g., by pressing a button or other control, to cause the remote control device 70 to wirelessly transmit at least a first type of signal designating a travel request to the truck 10. The travel r command that requests the corresponding truck 10 to travel by a predetermined amount, as will be described in greater detail herein.

The truck 10 also comprises one or more obstacle sensors 76, which are provided about the truck 10, e.g., towards the first end section of the power unit 14 and/or to the sides of the power unit 14. The obstacle sensors 76 include at least one contactless obstacle sensor on the truck 10, and are operable to define at least one detection zone. For example, at least one detection zone may define an area at least partially in front of a forward traveling direction of the truck 10 when the truck 10 is traveling in response to a wirelessly received travel request from the remote control device 70.

The obstacle sensors 76 may comprise any suitable proximity detection technology, such as ultrasonic sensors, optical recognition devices, infrared sensors, laser scanner sensors, etc., which are capable of detecting the presence of objects/obstacles or are capable of generating signals that can be analyzed to detect the presence of objects/obstacles within the predefined detection zone(s) of the power unit 14.

In practice, the truck 10 may be implemented in other formats, styles and features, such as an end control pallet truck that includes a steering tiller arm that is coupled to a tiller handle for steering the truck. Similarly, although the remote control device 70 is illustrated as a glove-like structure 70, numerous implementations of the remote control device 70 may be implemented, including for example, finger worn, lanyard or sash mounted, etc. Still further, the truck, remote control system and/or components thereof, including the remote control device 70, may comprise any additional and/or alternative features or implementations.

Control System for Remote Operation of a Low Level Order Picking Truck

Figure 2:
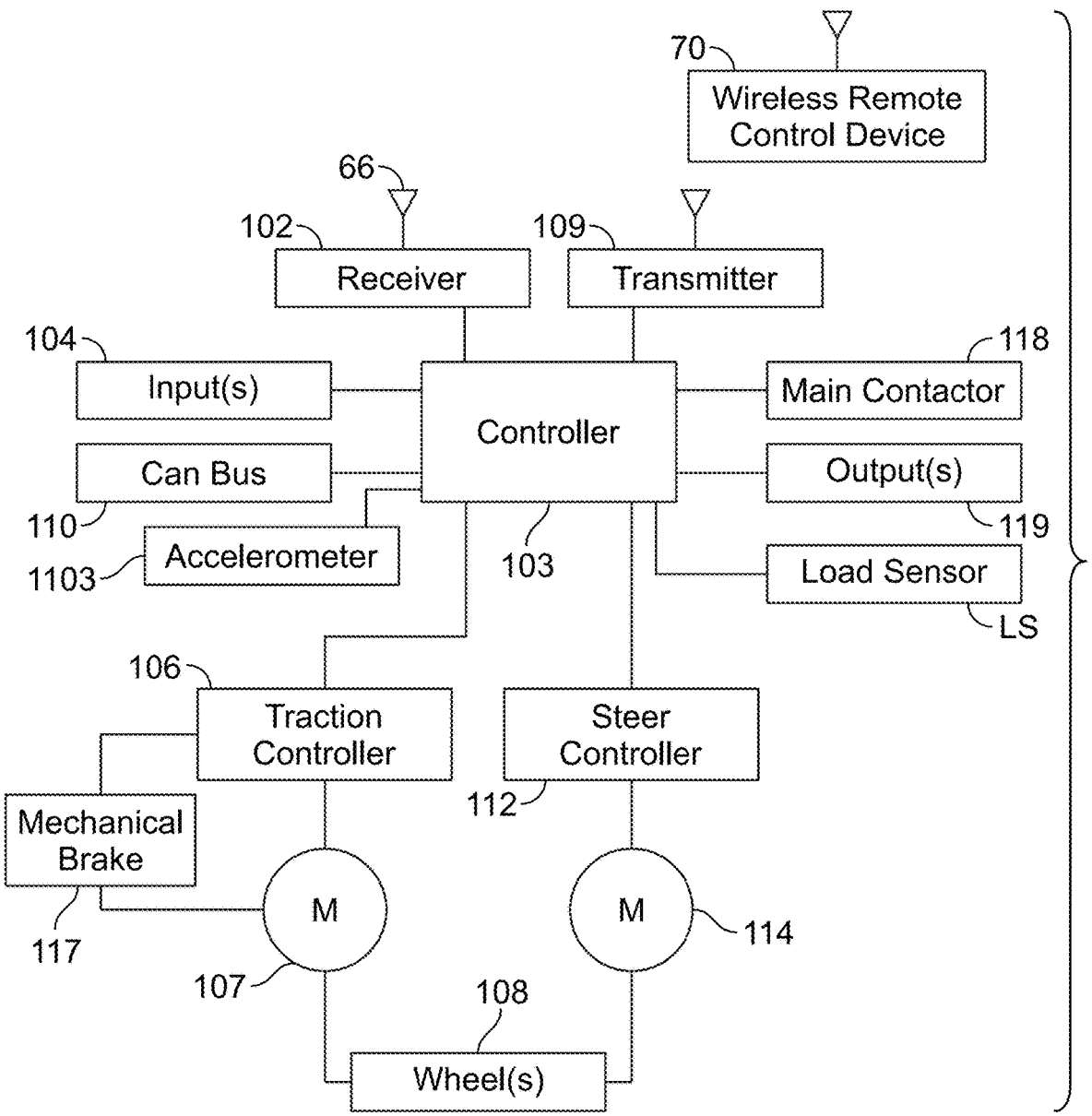
FIG. 2 is a schematic diagram of several components of a materials handling vehicle capable of remote wireless operation according to one or more embodiments shown and described herein.

Referring to FIG. 2, a block diagram illustrates a control arrangement for integrating remote control commands with the truck 10. The antenna 66 is coupled to a receiver 102 for receiving commands issued by the remote control device 70. The receiver 102 passes the received control signals to the controller 103, which implements the appropriate response to the received commands and may thus also be referred to herein as a master controller. In this regard, the controller 103 is implemented in hardware and may also execute software (including firmware, resident software, microcode, etc.) Furthermore, embodiments may take the form of a computer program product embodied in one or more computer readable medium(s) having computer readable program code embodied thereon.

Thus, the controller 103 may comprise an electronic controller defining, at least in part, a data processing system suitable for storing and/or executing program code and may include at least one processor 103A coupled directly or indirectly to memory elements, e.g., through a system bus or other suitable connection. The memory elements can include local memory employed during actual execution of the program code, memory that is integrated into a microcontroller or application specific integrated circuit (ASIC), a programmable gate array or other reconfigurable processing device, etc. The at least one processor may include any processing component operable to receive and execute executable instructions (such as program code from one or more memory elements). The at least one processor may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The response implemented by the controller 103 in response to wirelessly received commands, e.g., via the wireless transmitter of the remote control device 70 and corresponding antennae 66 and receiver 102, may comprise one or more actions, or inactions, depending upon the logic that is being implemented. Positive actions may comprise controlling, adjusting or otherwise affecting one or more components of the truck 10. The controller 103 may also receive information from other inputs 104, e.g., from sources such as the presence sensors 58, the obstacle sensors 76, switches, load sensors, encoders and other devices/features available to the truck 10 to determine appropriate action in response to the received commands from the remote control device 70. The sensors 58, 76, etc. may be coupled to the controller 103 via the inputs 104 or via a suitable truck network, such as a control area network (CAN) bus 110.

A further input into the controller 103 may be a weight signal generated by a load sensor LS, such as a conventional pressure transducer, see FIG. 2, which senses the combined weight of the forks 16 and any load on the forks 16. The load sensor LS may be incorporated into a hydraulic system for effecting lift of the forks 16. By subtracting the weight of the forks 16 (a known constant value) from the combined weight of the forks 16 and a load L on the forks 16, which combined weight is defined by the weight signal from the load sensor LS, the controller 103 determines the weight of the load L on the forks 16. Alternatively, in place of the pressure transducer LS incorporated into the hydraulic system, one or more weight sensing cells (not shown) may be integrated into the forks 16 to sense a load L on the forks 16 and generate a corresponding load sensing signal to the controller 103.

The controller 103 is also capable of determining the vertical location, i.e., height, of the load handling assembly 12 including the forks 16 relative to ground, such as a floor surface along which the truck 10 travels, as follows. One or more height sensors or switches may be provided in the second end section 14B of the power unit 14, which sense when the load handling assembly 12 including the forks 16 is raised vertically relative to ground and/or a lower point on the first end section 14A of the power unit 14. For example, first, second and third switches (not shown) may be provided within the second end section 14B at first, second and third vertical locations, designated by dotted lines 141A, 141B and 141C in FIG. 1A, which switches are actuated as the load handling assembly 12 is raised. A lowermost position of the load handling assembly 12 may also be determined via the load sensor LS indicating a zero weight.

In one embodiment, the controller 103 may comprise one or more accelerometers which may measure physical acceleration of the truck 10 along one, two or three axes. It is also contemplated that the accelerometer 1103 may be separate from the controller 103 but coupled to and in communication with the controller 103 for generating and transmitting to the controller 103 acceleration signals, see FIG. 2. For example, the accelerometer 1103 may measure the acceleration of the truck 10 in a direction of travel DT (also referred to herein as a first direction of travel) of the truck 10, which, in the FIG. 1A embodiment, is collinear with an axis X, which X axis may be generally parallel with the forks 16. The direction of travel DT or first direction of travel may be defined as the direction in which the truck 10 is moving, either in a forward or power unit first direction or a reverse or forks first direction.

The accelerometer 1103 may further measure the acceleration of the truck 10 along a transverse direction TR (also referred to herein as a second direction) generally 90 degrees to the direction of travel DT of the truck 10, which transverse direction TR, in the FIG. 1A embodiment, is collinear with an axis Y. The accelerometer 1103 may also measure the acceleration of the truck 10 in a further direction transverse to both the direction of travel DT and the transverse direction TR, which further direction is generally collinear with a Z axis.

In an exemplary arrangement, the remote control device 70 is operative to wirelessly transmit a control signal that represents a first type signal such as a travel command to the receiver 102 on the truck 10. The travel command is also referred to herein as a "travel signal", "travel request" or "go signal". The travel request is used to initiate a request to the truck 10 to travel by a predetermined amount, e.g., to cause the truck 10 to advance or jog, typically only in the power unit first direction, by a limited travel distance. The limited travel distance may be defined by an approximate travel distance, travel time or other measure. In one implementation, the truck may be driven continuously as long as an operator provides a travel request not lasting longer than a predetermined time amount, e.g., 20 seconds. After the operator no longer provides a travel request or if the travel request has been provided for more than the predetermined time period, a traction motor effecting truck movement is no longer activated and the truck is permitted to coast to a stop. The truck 10 may be controlled to travel in a generally straight direction or along a previously determined heading.

Thus, a first type signal received by the receiver 102 is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. Stopping the truck 10 may be implemented, for example, by either allowing the truck 10 to coast to a stop or by initiating a brake operation to cause the truck 10 to brake to a stop.

As an example, the controller 103 may be communicably coupled to a traction control system, illustrated as a traction motor controller 106 of the truck 10. The traction motor controller 106 is coupled to a traction motor 107 that drives at least one driven wheel 108 of the truck 10. The controller 103 may communicate with the traction motor controller 106 so as to accelerate, decelerate, adjust and/or otherwise limit the speed of the truck 10 in response to receiving a travel request from the remote control device 70. The controller 103 may also be communicably coupled to a steer controller 112, which is coupled to a steer motor 114 that steers at least one steered wheel 108 of the truck 10, wherein the steered wheel may be different from the driven wheel. In this regard, the truck 10 may be controlled by the controller 103 to travel an intended path or maintain an intended heading in response to receiving a travel request from the remote control device 70.

The controller 103 may determine whether the truck 10 is moving or stopped and a linear distance that the truck 10 has travelled as follows. First, the controller 103 may determine whether the truck 10 is moving or stopped using the signals generated by the accelerometer 1103 and integrating once. It is also possible to determine if the truck 10 is moving by determining if the current value from the accelerometer 1103 is greater than zero. The controller 103 may also determine the linear distance that the truck 10 has travelled using the signals generated by the accelerometer 1103 and integrating twice. Alternatively, the traction controller 106 may receive feedback signals generated by an encoder within the traction motor 107 and from those signals generate a motor angular velocity signal to the controller 103. The controller 103 may determine whether the vehicle is moving or stopped from the motor angular velocity signal. The controller 103 may also convert the motor angular velocity signal to an actual linear speed of the vehicle 10. If, for example, the velocity signal comprises an angular speed of the traction motor 107, then the controller 103 may scale that value to an actual linear speed of the vehicle 10 based on a) a gearing ratio between the traction motor 107 and a driven wheel of the vehicle and b) the circumference of the driven wheel. The linear speed of the vehicle may then be used (via integration) to determine a distance that the truck 10 has travelled.

As yet another illustrative example, the controller 103 may also communicate with the traction controller 106 to decelerate, stop or otherwise control the speed of the truck 10 in response to receiving a travel request from the remote control device 70. Braking may be effected by the traction controller 106 by causing regenerative braking or activating a mechanical brake 117 coupled to the traction motor 107, see FIG. 2. Still further, the controller 103 may be communicably coupled to other vehicle features, such as main contactors 118, and/or other outputs 119 associated with the truck 10, where applicable, to implement desired actions in response to implementing remote travel functionality.

According to embodiments, the controller 103 may communicate with the receiver 102 and with the traction controller 106 to operate the truck 10 under remote control in response to receiving travel commands from the associated remote control device 70.

Correspondingly, if the truck 10 is moving in response to a command received by remote wireless control, the controller 103 may dynamically alter, control, adjust or otherwise affect the remote control operation, e.g., by stopping the truck 10, changing the steer angle of the truck 10, or taking other actions. Thus, the particular vehicle features, the state/condition of one or more vehicle features, vehicle environment, etc., may influence the manner in which controller 103 responds to travel requests from the remote control device 70.

The controller 103 may refuse to acknowledge a received travel request depending upon predetermined condition(s), e.g., that relate to environmental or/operational factor(s). For example, the controller 103 may disregard an otherwise valid travel request based upon information obtained from one or more of the sensors 58, 76. As an illustration, according to embodiments, the controller 103 may optionally consider factors such as whether an operator is on the truck 10 when determining whether to respond to a travel command from the remote control device 70. As noted above, the truck 10 may comprise at least one presence sensor 58 for detecting whether an operator is positioned on the truck 10. In this regard, the controller 103 may be further configured to respond to a travel request to operate the truck 10 under remote control when the presence sensor(s) 58 designate that no operator is on the truck 10. Thus, in this implementation, the truck 10 cannot be operated in response to wireless commands from the transmitter unless the operator is physically off of the truck 10. Similarly, if the object sensors 76 detect that an object, including the operator, is adjacent and/or proximate to the truck 10, the controller 103 may refuse to acknowledge a travel request from the transmitter 70. Thus, in an exemplary implementation, an operator must be located within a limited range of the truck 10, e.g., close enough to the truck 10 to be in wireless communication range (which may be limited to set a maximum distance of the operator from the truck 10). Other arrangements may alternatively be implemented.

Any other number of reasonable conditions, factors, parameters or other considerations may also/alternatively be implemented by the controller 103 to interpret and take action in response to received signals from the transmitter.

Upon acknowledgement of a travel request, the controller 103 interacts with the traction motor controller 106, e.g., directly or indirectly, e.g., via a bus such as the CAN bus 110 if utilized, to advance the truck 10 by a limited amount. Depending upon the particular implementation, the controller 103 may interact with the traction motor controller 106 and optionally, the steer controller 112, to advance the truck 10 by a predetermined distance. Alternatively, the controller 103 may interact with the traction motor controller 106 and optionally, the steer controller 112, to advance the truck 10 for a period of time in response to the detection and maintained actuation of a travel control on the remote 70. As yet another illustrative example, the truck 10 may be configured to jog for as long as a travel control signal is received. Still further, the controller 103 may be configured to "time out" and stop the travel of the truck 10 based upon a predetermined event, such as exceeding a predetermined time period or travel distance regardless of the detection of maintained actuation of a corresponding control on the remote control device 70.

The remote control device 70 may also be operative to transmit a second type signal, such as a "stop signal", designating that the truck 10 should brake and/or otherwise come to rest. The second type signal may also be implied, e.g., after implementing a "travel" command, e.g., after the truck 10 has traveled a predetermined distance, traveled for a predetermined time, etc., under remote control in response to the travel command. If the controller 103 determines that a wirelessly received signal is a stop signal, the controller 103 sends a signal to the traction controller 106 and/or other truck component to bring the truck 10 to a rest. As an alternative to a stop signal, the second type signal may comprise a "coast signal" or a "controlled deceleration signal" designating that the truck 10 should coast, eventually slowing to rest.

The time that it takes to bring the truck 10 to a complete rest may vary, depending for example, upon the intended application, the environmental conditions, the capabilities of the particular truck 10, the load on the truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop. Alternatively, a braking operation may be applied after a predetermined delay time to allow a predetermined range of additional travel to the truck 10 after the initiation of the stop operation.

It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation. Under such conditions, the controller 103 may instruct the traction controller 106 to brake via regenerative braking or applying the mechanical brake 117 to stop the truck 10.

Calculating Vehicle Drive Parameter(s) for Use During Remote Control Operation of Vehicle As noted above, an operator may stand on the platform 32 within the operator's station 30 to manually operate the truck 10, i.e., operate the truck in a manual mode. The operator may steer the truck 10 via the handle 52, see FIG. 1B, and, further, may cause the truck 10 to accelerate via rotation of the travel switch 54. As also noted above, rotation of the travel switch 54 forward and upward will cause the truck 10 to move forward, e.g., power unit first, at an acceleration that may be proportional to the amount of rotation of the travel switch 54. Similarly, rotating the travel switch 54 toward the rear and downward of the truck 10 will cause the truck 10 to move in reverse, e.g., forks first, at an acceleration that may be proportional to the amount of rotation of the travel switch 54. Rotation of the travel switch 54 forward and upward while the truck 10 is moving in the forks first direction will cause the truck 10 to brake. Also, rotating the travel switch 54 toward the rear and downward while the truck 10 is moving in the power unit first direction will cause the truck 10 to brake. Hence, "manual operation of the vehicle by an operator" occurs when an operator is standing on the platform 32 within the operator's station 30 and steering the truck 10 via the handle 52 and accelerating/braking (i.e., regenerative braking) the truck via rotation of the travel switch 54. A separate brake switch, for example switch 41 of FIG. 1B, can be used by the operator to cause regenerative braking of the truck 10. As noted above, braking may also be effected via the mechanical brake.

As also noted above, the controller 103 may communicate with the receiver 102 and with the traction controller 106 to operate the truck 10 under remote control in response to receiving travel commands from the associated remote control device 70. The travel request is used to initiate a request to the truck 10 to travel by a predetermined amount, e.g., to cause the truck 10 to advance or jog in the first direction of travel, i.e., in the power unit first direction, by a limited travel distance. Hence, the operator may operate the truck 10 in a remote control mode when the operator is not physically present on the truck but is walking near the truck 10 such as during a picking operation, i.e., when the operator is located off the truck 10 and picking or gathering pick items from warehouse storage areas to be loaded on the truck 10, using the remote control device 70 to operate the truck 10 under remote control. Operating the truck 10 in the remote control mode is also referred to herein as "semi-automated" operation of the truck 10.

When an operator is using the truck 10, such as during a picking operation within a warehouse, the operator typically uses the truck 10 in both the manual mode and the remote control mode.

Previously, a vehicle controller stored a predefined, fixed vehicle parameter, e.g., a maximum acceleration, to limit the maximum acceleration of the vehicle during operation of the vehicle in the remote control mode. This predefined maximum acceleration limit was sometimes too high, e.g., if the truck was being loaded with a tall stack of articles/packages defining loads that were unstable, and too low if the truck was being loaded with a short stack of articles/packages defining loads that were stable.

In accordance with embodiments of the present disclosure, the controller 103 monitors one or more drive parameters during a most recent manual operation of the truck 10, in which one or more drive parameters correspond to a driving behavior or trait of an operator of the truck 10. If the one or more drive parameters are high, this may correspond to the operator driving the truck 10 briskly. If the one or more drive parameters are low, this may correspond to the operator driving the truck 10 conservatively or cautiously. Instead of using one or more predefined, fixed drive parameters for vehicle control during remote control operation of the truck 10, the controller 103 calculates one or more adaptive drive parameters for use during a next remote control operation of the truck 10 based on the one or more drive parameters monitored during a most recent manual operation of the truck 10. Since the one or more drive parameters calculated for use in the next remote control operation of the truck 10 are based on recent driving behavior of the operator, i.e., the one or more drive parameters monitored during the most recent manual mode operation of the truck 10, it is believed that the controller 103 more accurately and appropriately defines the one or more drive parameters to be used during a next remote control operation of the truck 10 such that the one or more drive parameters more closely match to the most recent driving behavior of the operator.

Figure 3:
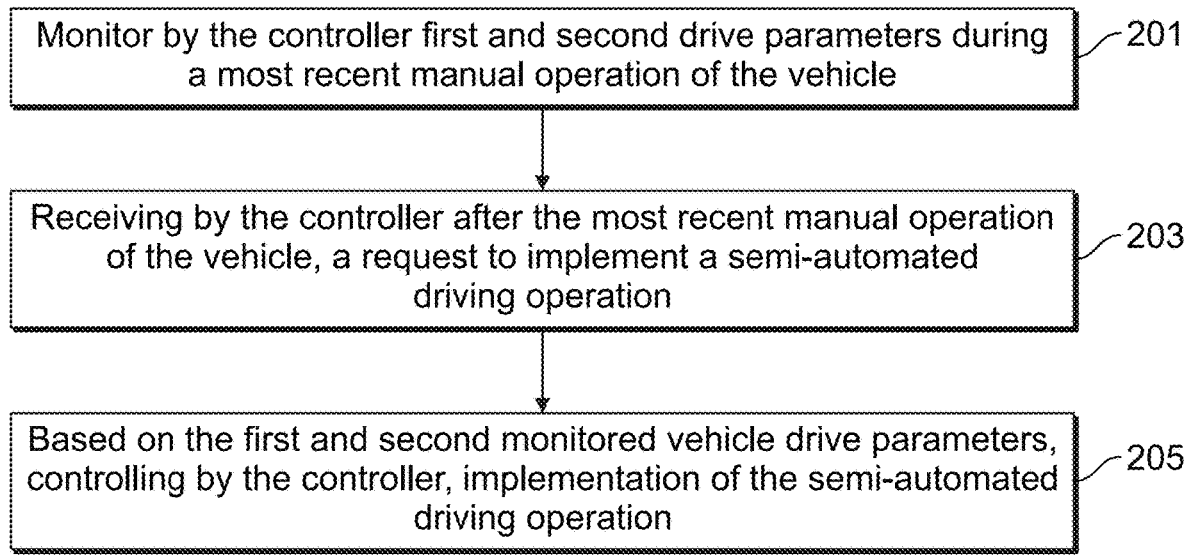
FIG. 3 depicts a flowchart of an example algorithm for monitoring first and second drive parameters during a most recent manual operation of the vehicle and, based on the first and second drive parameters, controlling implementation of a semi-automated driving operation according to one or more embodiments shown and described herein.

An example control algorithm, or process, for the controller 103 is illustrated in FIG. 3 for monitoring first and second drive parameters, e.g., acceleration in first and second directions, during a most recent manual operation of the truck 10 to calculate a corresponding adaptive drive parameter, e.g., a maximum acceleration, to be used by the controller 103 when the truck 10 is next operated in the remote control mode.

In step 201, the controller 103 monitors concurrently during a most recent manual operation of the vehicle, a first drive parameter, e.g., a first acceleration, corresponding to a first direction of travel of the vehicle or truck 10 and a second drive parameter, e.g., a second acceleration, corresponding to a second direction, which is different from the first direction of travel. In the illustrated embodiment, the first direction of travel may be defined by the direction of travel DT of the truck 10, see FIG. 1, and the second direction may be defined by the transverse direction TR. Hence, the first and second directions may be substantially orthogonal to one another. The controller 103 replaces any stored data, i.e., first stored data, regarding the monitored first and second vehicle drive parameters corresponding to the previous manual operation of the vehicle by the operator with recent data, i.e., second data, regarding the monitored first and second vehicle drive parameters during the most recent manual operation of the vehicle, wherein the recent data is not calculated using or based on the previously stored data from the previous manual operation of the vehicle. The vehicle may have been operated in a remote control mode after the previous manual operation of the vehicle and before the most recent manual operation of the vehicle.

An operator may vary acceleration of the truck 10 based on factors such as the curvature of the path along which the truck 10 is being driven, the turning angle of the truck 10, the current floor conditions, e.g., a wet/slippery floor surface or a dry/non-slippery floor surface, and/or the weight and height of any load being carried by the truck 10. For example, if the truck 10 is being driven without a load or with a stable load, e.g., the load has a low height, over a long, straight path, on a dry/non-slippery floor surface, then values for the first acceleration may be high. However, if the truck 10 has an unstable load, e.g., the load has a high height, such that the load may shift or fall from the truck 10 if the truck 10 is accelerated quickly, then values for the first acceleration may be low. Also, if the truck 10 is being turned at a sharp angle and driven at a high speed, then values for the first acceleration may be high and values for the second acceleration may also be high.

In step 203, the controller 103 receives, after the most recent manual operation of the vehicle or truck 10, a request to implement a semi-automated driving operation, i.e., a request to operate the truck 10 in the remote control mode. In the illustrated embodiment and as discussed above, the controller 103 may receive a travel request from the remote control device 70. Such a travel request may define a request to implement a first semi-automated driving operation.

In step 205, the controller 103, based on the first and second monitored vehicle drive parameters during the most recent manual operation of the truck 10, implements the semi-automated driving operation of the truck 10. The controller 103, based on the recent data regarding the monitored first and second vehicle drive parameters during the most recent manual operation of the vehicle, calculates a first value indicative of acceleration of the truck 10 in the first direction and a second value indicative of acceleration of the truck 10 in the second direction. The controller 103 modifies the first value indicative of acceleration in the first direction based on the second value indicative of acceleration in the second direction if the second value falls outside of a pre-defined range. The first value, whether modified or not based on whether the second value falls outside or within the pre-defined range, defines a maximum acceleration that cannot be exceeded during the semi-automated driving operation of the truck 10.

Figure 4:
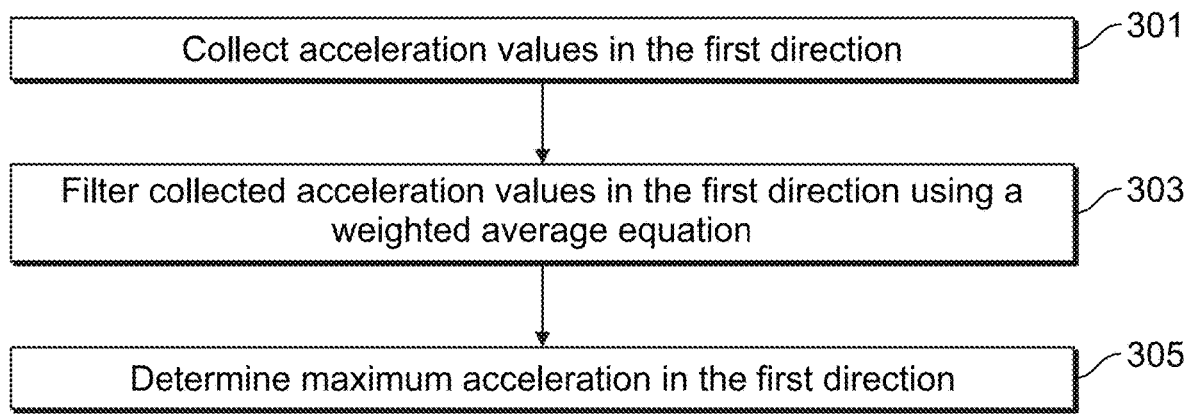
FIG. 4 depicts a flowchart of an example algorithm for calculating a first value indicative of acceleration of the vehicle in a first direction during a most recent manual operation of the vehicle according to one or more embodiments shown and described herein.

An example control algorithm, or process, for the controller 103 is illustrated in FIG. 4 for calculating a first value indicative of acceleration of the truck 10 in the first direction during the most recent manual operation of the truck 10. In step 301, a sequence of acceleration values in the first direction from the accelerometer 1103 are collected during the most recent manual operation of the vehicle, wherein the first direction is defined by the direction of travel DT of the truck 10, and stored in memory by the controller 103. Rotation of the travel switch 54 forward and upward will cause the truck 10 to move forward, e.g., power unit first, at a positive acceleration in the power unit first direction proportional to the amount of rotation of the travel switch 54. Similarly, rotating the travel switch 54 toward the rear and downward of the truck 10 will cause the truck 10 to move in reverse, e.g., forks first, at a positive acceleration in the forks first direction proportional to the amount of rotation of the travel switch 54. As the truck 10 accelerates in either the power unit first direction or the forks first direction, both considered the first direction as defined by the direction of travel DT of the truck 10, the accelerometer 1103 generates a sequence of positive acceleration values that are stored in memory by the controller 103. Rotation of the travel switch 54 forward and upward while the truck 10 is moving in the forks first direction will cause the truck 10 to decelerate or brake. Also, rotating the travel switch 54 toward the rear and downward while the truck 10 is moving in the power unit first direction will cause the truck 10 to decelerate or brake. In accordance with a first embodiment, negative acceleration values, such as occurring during braking, are not collected for use in calculating the first value indicative of acceleration of the truck 10 in the first direction during the most recent manual operation of the vehicle.

While rotation of the travel switch 54 forward and upward will cause the truck 10 to move forward, i.e., power unit first, at a positive acceleration (speed is increasing) in the power unit first direction, the accelerometer may determine that such movement comprises a positive acceleration. The accelerometer may also determine that braking (speed is decreasing) while the truck 10 is traveling in the power unit first direction comprises deceleration or negative acceleration. Further, while rotating the travel switch 54 toward the rear and downward will cause the truck 10 to move in reverse, e.g., forks first, at a positive acceleration (speed is increasing) in the forks first direction, the accelerometer may determine that such movement where the speed is increasing in the forks first direction comprises a negative acceleration. The accelerometer may also determine that braking (speed is decreasing) while the truck 10 is traveling in the forks first direction comprises a positive acceleration. However, for purposes of the discussion herein of a control algorithm for calculating a maximum acceleration to be used during a next semi-automated driving operation, acceleration and deceleration during movement of the truck 10 in the power unit first direction and the forks first direction will be defined as follows: rotation of the travel switch 54 forward and upward causing the truck 10 to move forward, e.g., power unit first, is defined as a positive acceleration (speed is increasing) in the power unit first direction; rotating the travel switch 54 toward the rear and downward causing the truck 10 to move in reverse, e.g., forks first, is defined as a positive acceleration (speed is increasing) in the forks first direction; rotation of the travel switch 54 forward and upward or actuating the brake switch 41 while the truck 10 is moving in the forks first direction causing the truck 10 to decelerate or brake (speed is decreasing) is defined as a negative acceleration or deceleration; and rotation of the travel switch 54 toward the rear and downward or actuation of the brake switch 41 while the truck 10 is moving in the power unit first direction causing the truck 10 to decelerate or brake (speed is decreasing) is defined as a negative acceleration or deceleration.

As noted above, in accordance with a first embodiment, negative acceleration values, such as occurring during braking in either the power unit first direction or the forks first direction, are not collected for use in calculating the first value indicative of acceleration of the truck 10 in the first direction during the most recent manual operation of the vehicle. However, in accordance with a second embodiment, both positive acceleration values (where the speed of the truck is increasing in either the power unit first or the forks first direction) and negative acceleration values (where the speed of the truck is decreasing in either the power unit first or the forks first direction) are collected and used in calculating the first value indicative of acceleration of the truck 10 in the first direction during the most recent manual operation of the vehicle. In the second embodiment where negative acceleration values are collected, the absolute value of the negative acceleration values are used in the described equations and calculations set out below. Accordingly, while some embodiments may ignore any negative acceleration data, other embodiments can consider such data by using the absolute value of the negative acceleration data in the described equations and calculations.

In step 303, the acceleration values in the first direction collected during the most recent manual operation of the truck 10 are filtered with a weighted average equation so as to make maximum outliers less weighted and effect smoothing. Example equation 1, set out below, may be used to filter the collected acceleration values in the first direction to calculate weighted average values based on the collected acceleration values in the first direction from the most recent manual operation of the truck 10.

$$wa_{x-(i+1)} = \frac{wa_{x-i} * g_1 + a_{x_{[(i*m)+1]}} * g_2 + a_{x_{[(i*m)+2]}} * g_3 + a_{x_{[(i*m)+3]}} * g_4}{\sum g_s}$$ Equation 1

$wa_{x-(i+1)}$=calculated weighted average in a first direction (e.g., "x"); where i=1 . . . (n−1) and n is the total number of subsets into which the individual collected acceleration values, $a_{x\_j}$, are grouped;

$wa_{x-i}$; where i=1 . . . n; $wa_{x-i}$=arithmetic average of the first three "start" acceleration values in the first direction for the first calculation and thereafter the most recent weighted average;

$g_s$-weighting factor where s=1 . . . m+1, where m is the number of members in each subset;

$g_1$=weighting factor of wax-i; in the illustrated embodiment, $g_1$=3, but could be any value;

$g_2$, $g_3$, $g_4$-additional weighting factors=1, but could be any value and is typically less than $g_1$;

$a_{x\_[(i*m)+1]}$, $a_{x\_[(i*m)+2]}$, $a_{x\_[(i*m)+3]}$, where i=1 . . . (n−1); $a_{x\_[(i*m)+1]}$, $a_{x\_[(i*m)+2]}$, $a_{x\_[(i*m)+3]}$=three adjacent individual acceleration values in the first direction, defining a subset, collected during the most recent manual operation of the truck 10. The subset could comprise more than three or less than three acceleration values. The first three collected acceleration values ($a_{x\_1}$, $a_{x\_2}$, and $a_{x\_3}$) make up a first subset as well.

The first "start" acceleration values in the first direction could comprise less than three or more than three values and the number of members in each subset "m" could likewise comprise less than three or more than three members.

For purposes of illustration, sample calculations will now be provided based on non-real sample values, which simulate collected acceleration values in the first direction, and are set out in Table 1 of FIG. 5. All of the acceleration values set out in Table 1 are positive values. However, as noted above, negative acceleration values could be collected and used as well. As further noted above, where negative acceleration values are collected, the absolute value of the negative acceleration values are used in combination with the acceleration values in the described equations and calculations set out herein.

$wa_{x-1}$ = arithmetic average of the first three "start" acceleration values =

$$\frac{a_{x\_1} + a_{x\_2} + a_{x\_3}}{m} = \frac{1 + 2 + 4}{3} = 2.33$$

$Wa_{x-2}$ = first weighted average value =

$$\frac{g_1 * wa_{x-1} + g_2 * a_{x\_4} + g_3 * a_{x\_5} + g_4 * a_{x\_6}}{\sum g_s} =$$

$$\frac{3 * 2.33 + 1 * 8 + 1 * 3 + 1 * 2}{6} = 3.33$$

$a_{x-3}$ = second weighted average value =

$$\frac{g_1 * wa_{x-2} + g_2 * a_{x_7} + g_3 * a_{x_8} + g_4 * a_{x_9}}{\sum g_s} =$$

$$\frac{3 * 3.33 + 1 * 1 + 1 * 0 + 1 * 0}{6} = 1.83$$

The remaining weighted average values based on the sample values set out in Table 1 of FIG. 5 are calculated in a similar manner. The results are set out in Table 2 of FIG. 6.

Figures 6, 7, 8:
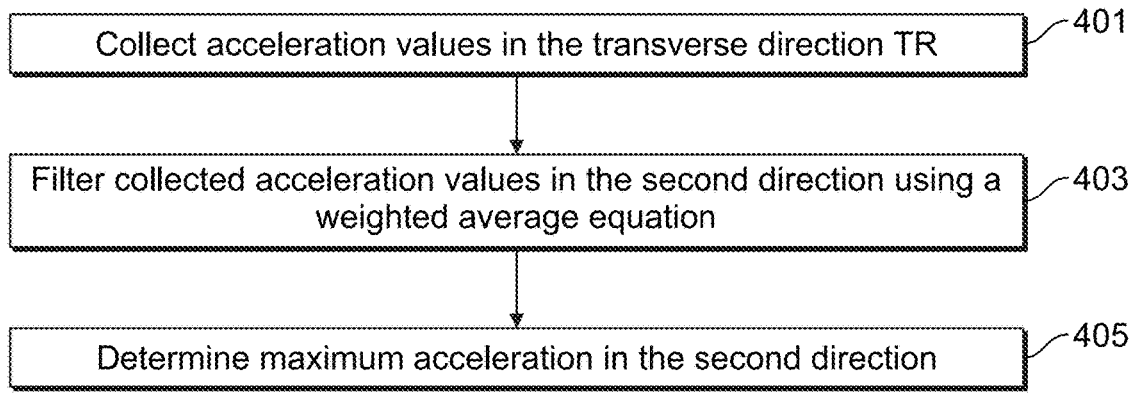
FIG. 6 illustrates a table containing sample values of wax-i according to one or more embodiments shown and described herein.
FIG. 7 depicts a flowchart of an example algorithm for calculating a second value indicative of acceleration of the vehicle in a second direction during a most recent manual operation of the vehicle according to one or more embodiments shown and described herein.
FIG. 8 illustrates a table containing non-real sample acceleration values in the second direction corresponding to a most recent manual operation of the vehicle according to one or more embodiments shown and described herein.

Thus, with respect to Equation 1, the values $a_{x\_[(i*m)+1]}$, $a_{x\_[(i*m)+2]}$, and $a_{x\_[(i*m)+3]}$ are used in the calculation of a weighted average value wax−(i+1). According to the example of FIG. 5, "i" can range from 1 to 9, but for purposes of Equation 1, "i" ranges from 1 to 8. Accordingly, the 27 acceleration values (i.e., $a_{x\_j}$, "j"=27 individual collected acceleration values in the Example of FIG. 5) in the table of FIG. 5 can be arranged as 9 distinct subsets each having 3 elements. Other than the first subset, which, as noted above, comprise an arithmetic average of the first three "start" acceleration values in the first direction, for each of the subsequent 8 subsets, a weighted average is calculated according to Equation 1. The example initial arithmetic average and the example 8 weighted averages are shown in FIG. 6. One of ordinary skill will readily recognize that the subset size of 3 values is merely an example and that utilizing 9 subsets is an example amount as well.

In step 305 of FIG. 4, a maximum acceleration in the first direction defined by the direction of travel DT of the truck 10 is determined using example Equation 2, set out below:

$a_{x-wa-max}$ = maximum acceleration in the first direction = Equation 2 max($wa_x - i$) = maximum value of the initial arithmetic and weighted averages ($wa_{x-i}$) calculated.

Based on the results from Table 2 of FIG. 6, max ($wa_{x-i}$)=$a_{x-8}$=3.82.

It is noted that $a_{x-wa-max}$ may be selected from any number of initial arithmetic and weighted average values ($wa_{x-i}$) calculated. For example, the average values ($wa_{x-i}$) calculated during a predetermined time period, e.g., the last ten seconds, may be considered. It is also contemplated that a predetermined number of initial arithmetic and weighted average values ($wa_{x-i}$) calculated, e.g., 25 average values, without taking time into account, may be considered. It is further contemplated that all of the initial arithmetic and weighted average values ($wa_{x-i}$) calculated during the entirety of the most recent manual operation of the truck 10 may be considered. In the illustrated example, nine (9) values of initial arithmetic and weighted averages ($w_{x-i}$) were considered. However, less than 9 or greater than 9 values of initial arithmetic and weighted averages ($wa_{x-i}$) can be considered when selecting max ($a_{x-wa-i}$)=maximum value of the initial arithmetic and weighted averages ($wa_{x-i}$) calculated, which defines the $a_{x-wa-max}$=maximum acceleration in the first direction. The maximum acceleration in the first direction ($a_{x-wa-max}$) defines the first value indicative of acceleration of the vehicle in the first direction during the most recent manual operation of the vehicle. Instead of selecting the maximum or highest value from the set of initial arithmetic and weighted average values ($wa_{x-i}$) considered as the maximum acceleration in the first direction $a_{x\text{-}wa\text{-}max}$, it is contemplated that a second or a third highest value of the initial arithmetic and weighted average values ($wa_{x\text{-}i}$) considered may be selected as the maximum acceleration in the first direction $a_{x\text{-}wa\text{-}max}$. It is further contemplated that the set of initial arithmetic and weighted average values ($wa_{x\text{-}i}$) considered may be averaged to determine the maximum acceleration in the first direction $a_{x\text{-}wa\text{-}max}$.

An example control algorithm, or process, for the controller 103 is illustrated in FIG. 7 for calculating a second value indicative of acceleration of the truck 10 in the second direction during the most recent manual operation of the truck 10. In step 401, a sequence of acceleration values in the second direction from the accelerometer 1103 are collected, wherein the second direction is defined by the transverse direction TR, see FIG. 1, and stored in memory by the controller 103.

In step 403, the collected acceleration values in the second direction collected during the most recent manual operation of the truck 10 are filtered with a weighted average equation so as to make maximum outliers less weighted and effect smoothing. Example equation 3, set out below, may be used to filter the collected acceleration values in the second direction from the most recent manual operation of the truck 10.

$$wa_{y\text{-}(i+1)} = \frac{wa_{y\text{-}i} * g_1 + a_{y_{[(i*m)+1]}} * g_2 + a_{y_{[(i*m)+2]}} * g_3 + a_{y_{[(i*m)+3]}} * g_4}{\sum g_s} \quad \text{Equation 3}$$

$Wa_{y\text{-}(i+1)}$=calculated weighted average in a second direction (e.g., "y"); where i=1 ... (n−1);

$Wa_{y\text{-}i}$; where i=1 ... n; $wa_{y\text{-}i}$=arithmetic average of the first three "start" acceleration values in the second direction for the first calculation and thereafter the most recently calculated weighted average;

$g_s$=weighting factor where s=1 ... m+1, where m is the number of members in each subset;

$g_1$=weighting factor of $wa_{y\text{-}i}$; in the illustrated embodiment, $g_1$=3, but could be any value;

$g_2$, $g_3$, $g_4$-additional weighting factors=1, but could be other values;

$a_{y\_[(i*m)+1]}$, $a_{y\_[(i*m)+2]}$, $a_{y\_[(i*m)+3]}$; where i=1 ... (n−1); $a_{y\_[(i*m)+1]}$, $a_{y\_[(i*m)+2]}$, $a_{y\_[(i*m)+3]}$=three adjacent individual acceleration values in the second direction, defining a subset, collected during the most recent manual operation of the truck 10. The subset could comprise more than three or less than three acceleration values. The first three collected acceleration values ($a_{y\_1}$, $a_{y\_2}$, and $a_{y\_3}$) make up a first subset as well.

The first "start" acceleration values in the second direction could comprise less than three or more than three values and the number of members in each subset "m" could likewise comprise less than three or more than three members.

For purposes of illustration, sample calculations will now be provided based on non-real sample values, which simulate collected acceleration values in the second direction, and are set out in Table 3 of FIG. 8.

$Wa_{y\text{-}1}$ = arithmetic average of the first three "start" acceleration values in the second direction =

$$\frac{a_{y\_1} + a_{y\_2} + a_{y\_3}}{m} = \frac{0.25 + 0.49 + 0.52}{3} = 0.42$$

$Wa_{y\text{-}2}$ = first weighted average vale =

The remaining weighted average value based on the sample values set out in Table 3 of FIG. 8 is calculated in a similar manner. The results are set out in Table 4 of FIG. 9.

Figures 9, 10, 11:
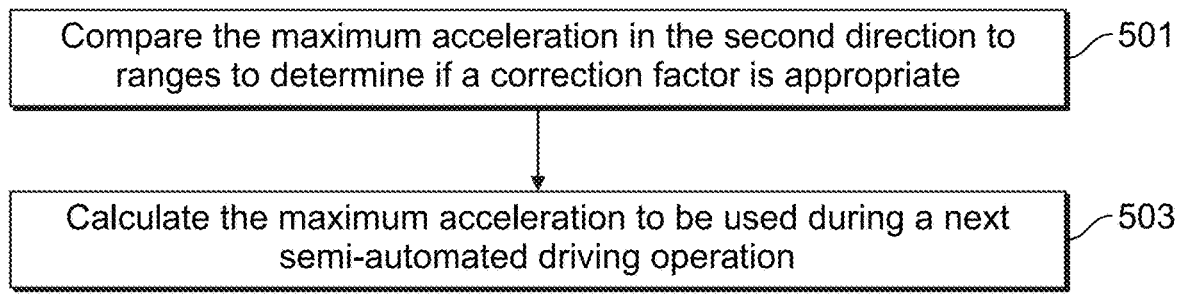
FIG. 9 illustrates a table containing sample values of way-i according to one or more embodiments shown and described herein.
FIG. 10 depicts a flowchart of an example algorithm for calculating a maximum acceleration to be used during a next semi-automated driving operation based on the first and second values indicative of acceleration of the vehicle in the first and second directions during the prior manual operation of the vehicle according to one or more embodiments shown and described herein.
FIG. 11 depicts a lookup table containing three separate ranges for the maximum acceleration in the second direction (ay-max) according to one or more embodiments shown and described herein.

In step 405 of FIG. 7, a maximum acceleration in the second direction defined by the transverse direction TR of the truck 10 is determined using Equation 4, set out below:

$a_{y\text{-}wa\text{-}max}$=maximum acceleration in the second direction=max ($wa_{y\text{-}i}$)=maximum value of the initial arithmetic and weighted averages ($wa_{y\text{-}i}$) calculated.     Equation 4:

Based on the results from Table 4 of FIG. 9, max ($wa_{y\text{-}i}$)=$wa_{y\text{-}2}$=0.55.

It is noted that $a_{y\text{-}wa\text{-}max}$ may be selected from the initial arithmetic average or any number of weighted averages ($W_{ay\text{-}(i+1)}$) calculated. For example, the initial arithmetic and weighted average values ($wa_{y\text{-}i}$) calculated during a predetermined time period, e.g., the last ten seconds, may be considered. It is also contemplated that a predetermined number of the initial arithmetic and weighted average values ($wa_{y\text{-}i}$) calculated, e.g., 25 average values, without taking time into account, may be considered. It is further contemplated that all of the initial arithmetic and weighted average values ($wa_{y\text{-}i}$) calculated during the entirety of the most recent manual operation of the truck 10 may be considered. In the illustrated example, three (3) values of the initial arithmetic and weighted averages ($wa_{y\text{-}i}$) were considered. However, less than 3 or greater than 3 values of the initial arithmetic and weighted averages ($wa_{y\text{-}i}$) can be considered when selecting max ($wa_{y\text{-}i}$)=maximum value of the initial arithmetic and weighted averages ($wa_{y\text{-}i}$) calculated, which defines the $a_{y\text{-}wa\text{-}max}$=maximum acceleration in the second direction. The maximum acceleration of the vehicle in the second direction ($a_{y\text{-}wa\text{-}max}$) defines the second value indicative of acceleration of the vehicle in the second direction during the most recent manual operation of the vehicle.

An example control algorithm, or process, for the controller 103 is illustrated in FIG. 10 for calculating a maximum acceleration to be used during a next semi-automated driving operation based on the first and second values indicative of acceleration of the truck 10 in the first and second directions during the prior or most recent manual operation of the truck 10. As noted above, the first value indicative of acceleration of the truck 10 in the first direction is defined by the maximum acceleration in the first direction ($a_{x\text{-}wa\text{-}max}$) and the second value indicative of acceleration of the truck 10 in the second direction is defined by the maximum acceleration in the second direction ($a_{y\text{-}wa\text{-}max}$). During operation of the truck 10, an operator may drive the truck 10 quickly along a generally straight path, but slowly during a turn. To factor in the operator driving the truck 10 slowly during a turn, in step 501, the controller 103 compares the maximum acceleration in the second direction ($a_{y\text{-}wa\text{-}max}$) to empirically determined ranges set out in a lookup table stored in memory to determine if a correction to the maximum acceleration in the first direction ($a_{x\text{-}wa\text{-}max}$) is appropriate.

As explained in detail below, the maximum acceleration in the second direction ($a_{y\text{-}wa\text{-}max}$) can be used to correct, or adjust, the calculated maximum acceleration in the first direction $a_{x\text{-}wa\text{-}max}$ when determining the maximum acceleration for the next semi-automated driving operation. The maximum acceleration in the second direction ($a_{y\text{-}wa\text{-}max}$) is likely indicative of the operator's evaluation of the stability of the truck 10 and its current load. If the maximum acceleration in the second direction is greater than a first empirically derived value or within an empirically derived "high acceleration" range, then that can indicate the operator believes the load is relatively stable and the maximum acceleration for the next semi-automated driving operation can be increased. However, if the maximum acceleration in the second direction is less than a second empirically derived value or falls within an empirically defined "low acceleration" range, then that can indicate the operator believes the load could be unstable even though the calculated maximum acceleration in the first direction is relatively high. Thus, in this second instance, the maximum acceleration for the next semi-automated driving operation can be decreased. If the maximum acceleration in the second direction is in-between the first and the second empirically derived values or within an empirically defined medium range, then no correction, or adjustment, of the maximum acceleration for the next semi-automated driving operation is made. High, low and medium ranges (or empirically derived first and second values) can be empirically determined for a particular vehicle in a controlled environment where the vehicle is operated at various maximum accelerations in the first and second directions, various high, low and medium ranges of differing values are created and, using the maximum acceleration values in the second direction, correction factors are determined and used to adjust the maximum acceleration values in the first direction. Preferred high, low and medium ranges, which allow for an optimum acceleration in the first direction yet allow the truck to carry and support loads in a stable manner are selected.

An exemplary simulated lookup table based on non-real values is set out in FIG. 11, which table contains three separate ranges for the maximum acceleration in the second direction ($a_{y\text{-}wa\text{-}max}$). If the maximum acceleration in the second direction falls within either the high or the low acceleration range depicted in the lookup table of FIG. 11, a corresponding correction factor is used in determining the maximum acceleration to be used during the next semi-automated driving operation of the truck 10. If the maximum acceleration in the second direction falls within the middle acceleration range (or mid-range) depicted in the lookup table of FIG. 11, no correction factor corresponding to the maximum acceleration in the second direction is used in determining the maximum acceleration for use during the next semi-automated driving operation of the truck 10.

In the example discussed above, the maximum acceleration in the second direction ($a_{y\text{-}wa\text{-}max}$)=0.55. This value falls within the high acceleration range, which corresponds to a correction factor of +10%.

In step 503, the maximum acceleration to be used during a next semi-automated driving operation (which may also be referred to as "a semi-automated driving operation maximum acceleration") is calculated using example Equation 5:

$$max.acc = \max(wa_{x-i}) * (1 + corr_x + corr_y) \quad \text{Equation 5}$$

Where max.acc=the maximum acceleration to be used in the first direction during a next semi-automated driving operation;
$corr_x$=a safety margin, which could be equal to any value. In the illustrated embodiment $corr_x$=−5% (may comprise a negative value as in the illustrated embodiment to reduce max.acc to provide a safety margin);
$corr_y$=correction factor from the lookup table in FIG. 11 and is based on the maximum acceleration in the second direction ($a_{y\text{-}wa\text{-}max}$).

A sample calculation for max.acc based on the sample values discussed above will now be provided.

$$max.acc = \max(wa_{x-i}) * (1 + corr_x + corr_y) = 3.82 * (1 - 0.05 + 0.1) = 4.01$$

Hence, in this sample, the controller 103 communicates with the traction motor controller 106 so as to limit the maximum positive acceleration (speed is increasing) of the truck 10 in the first direction during a next semi-automated or remote control operation to 4.01 m/s².

It is also contemplated that the controller 103 may calculate a first value indicative of only deceleration of the vehicle in the first direction during the most recent manual operation of the vehicle using equations 1 and 2 set out above, wherein the absolute value of each deceleration value collected from the most recent manual operation of the vehicle is used in calculating the first value using equations 1 and 2. Deceleration values corresponding to emergency breaking, which deceleration values may have very high magnitudes, are ignored in calculating the first value indicative of deceleration of the vehicle.

In the event that the truck 10 does not have an accelerometer, acceleration values in the first and second directions can be calculated in alternative manners. For example, acceleration in the direction of travel DT or first direction can be determined using a velocity sensor, wherein a velocity sensor may be provided on a traction motor controller. The controller 103 may differentiate the velocity or speed values to calculate acceleration values. Acceleration may also be derived from the angular position of the travel switch 54 relative to a home position, which grip 54, as noted above, controls the acceleration/braking of the truck 10. Using the angular position of the grip 54 as an input into a lookup table, a truck acceleration is chosen from the lookup table which corresponds specific grip angular position values with specific acceleration values. Maximum velocity values may also be provided by the lookup table based on grip angular positions.

Acceleration in the transverse direction TR or second direction can be determined using the following equation:
$acceleration_y = v^2/r$
where v=truck speed; and
r=radius of a curve through which the truck moves;
The radius r may be calculated using the following equation:

$r$=wheelbase dimension/$\sin \alpha$

Where the wheelbase dimension is a fixed value and is equal to the distance from the front wheels to the rear wheels of the truck 10; and
Steering angle $\alpha$, which is typically known by the controller 103 as it is the steered wheel angle.

The table of FIG. 5 represents a monitored drive parameter during a single manual operation. However, embodiments also contemplate monitoring and storing drive parameter data for more than a single manual operation of the truck 10. For example, data for one or more drive parameters can be monitored and stored for any number of the most recent manual operations.

The controller 103, therefore, can define a beginning and an ending to each manual operation so that the data pertaining to each manual operation can remain segregated from data pertaining to a different manual operation. A particular manual operation can be considered to begin when an operator is on the truck 10, such as indicated by a presence sensor 58, and moves the truck 10 with at least a minimum speed. Alternatively, a particular manual operation can be considered to begin when a drive signal is generated via the travel switch 54 and not via the remote control device 70. It is still further contemplated that a particular manual operation can be considered to begin when the operator is located outside of the operator's station 30 and causes the truck to move via activation of the drive control switch 140 located near the top of the second end section 14B of the power unit 14 of the truck 10. The particular manual operation can be considered to end when the truck 10 remains stationary for at least a predetermined time period. Alternatively, the particular manual operation can be considered to end when the truck 10 is stopped and the operator exits the truck. Alternatively, the particular manual operation can be considered to end when the operator initiates a semi-automated driving operation via the remote control device 70. Also, a manual operation can be considered to end when an operator exits the platform of the truck 10 even when the truck 10 is still moving.

As noted above, the monitored and stored data (whether from a single manual operation or from multiple manual operations) can then be used for controlling implementation of a subsequently-occurring semi-automated driving operation of the truck 10.

Clearing, or resetting, the stored data collected during one or more recent manual operations can be beneficial during or after certain driving operations of the truck 10. For example, data for monitored drive parameters collected and stored while a first pallet and items carried by or on the first pallet are being transported by the truck 10 may not be relevant to implementing semi-automated driving operations of the truck 10 once that first pallet is off-loaded from the truck 10 and a new empty pallet is acquired. Thus, when a new pick operation is commenced by the operator of the truck 10, the previously monitored and stored data about the one or more drive parameters during that current manual operation of the truck 10 can be discarded or, reset, so that only new monitored data about the one or more drive parameters is used to implement subsequently occurring semi-automated driving operations of the truck 10. In one embodiment, only the new monitored data about the one or more drive parameters collected during the current manual operation or the manual operation just before the subsequently occurring semi-automated driving operation is used to implement the subsequently occurring semi-automated driving operation and any data from prior manual operations occurring before the current manual operation or the manual operation just before the subsequently occurring semi-automated driving operation is ignored.

A typical stock picking operation involves an operator filling orders from available stock items that are located in storage areas provided along one or more aisles of a warehouse or distribution center. The operator drives the truck 10 between various pick locations where item(s) I are to be picked, which are typically loaded on one or more pallets P provided on the forks 16 of the load handling assembly 12, see FIG. 13, wherein the pallet P and the items I define a load L on or carried by the forks 16. Instead of a pallet, a roll cage, a freezer box or other special container could be provided on the forks 16 of the load handling assembly, wherein the roll cage, freezer box or other special container and picked items loaded on the roll cage, freezer box or other special container define a load on or carried by the forks 16. The operator may drive the truck 10 manually by using the steering handle 52 and the travel switch 54, as noted above, or operate the truck 10 in the remote control mode using the remote control device 70 for semi-automated control of the vehicle.

Accordingly, the controller 103 can analyze the driving operations of the truck 10 to automatically determine a sequence of operations, or a pattern, that is likely indicative of the start of a new pick operation. Under these circumstances, the controller 103 can then reset, or discard, the collected data about the monitored one or more drive parameters that occurred during the current manual operation. The term "current manual operation" can refer to a manual operation that is currently taking place, the term "most recent manual operation" can refer to a manual operation occurring immediately prior to the current manual operation that is still taking place, the term "previous manual operation" can refer to a manual operation occurring prior to the most-recent manual operation, and the term "next manual operation" can refer to a manual operation occurring subsequent to the current manual operation. Once the "current manual operation" ends it can be considered to be the "most-recent manual operation."

Figure 12:
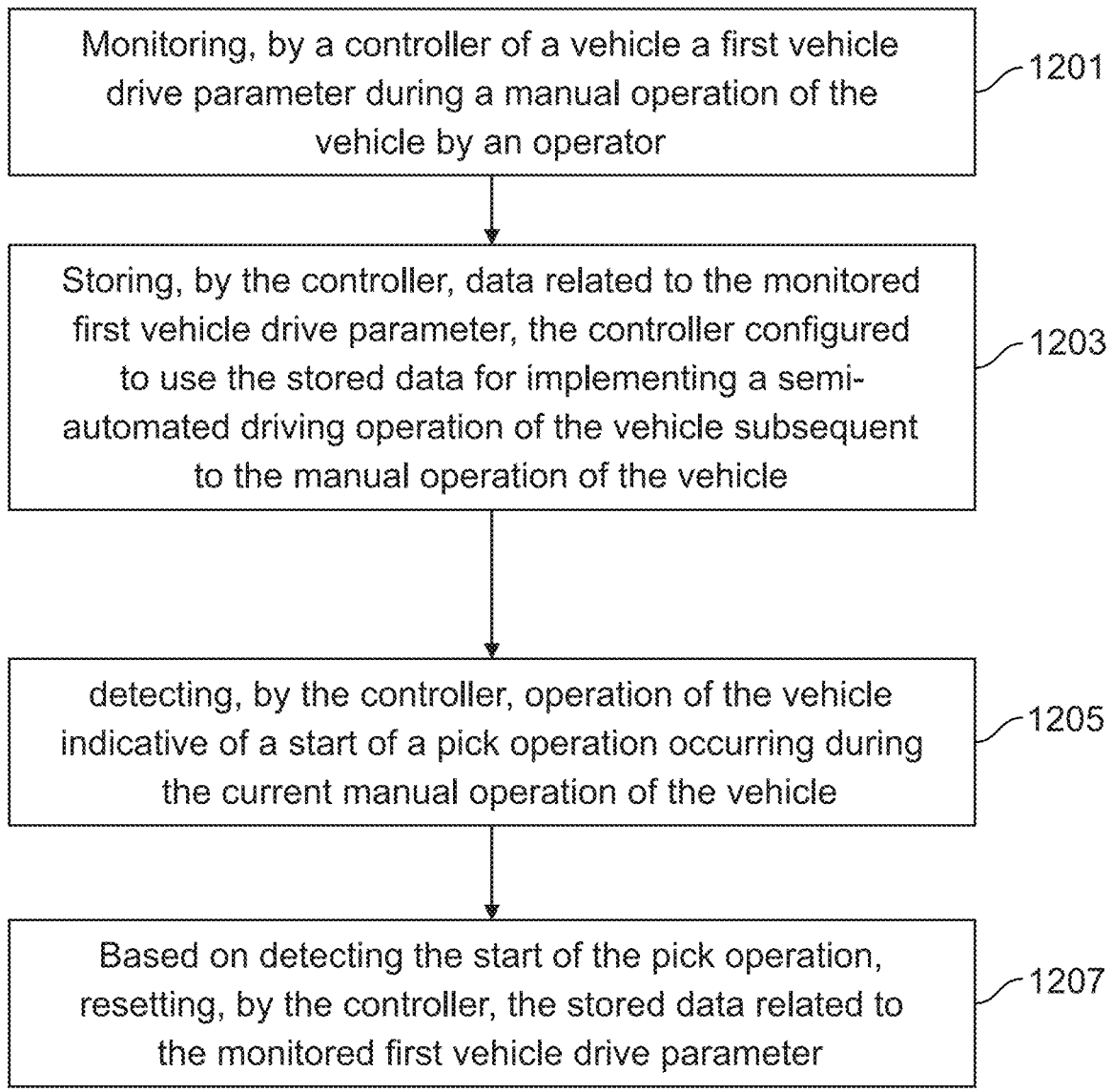
FIG. 12 depicts a flowchart of an example algorithm for resetting stored data related to the monitored first vehicle drive parameter based on detecting the start of the pick operation, according to one or more embodiments shown and described herein.

FIG. 12 depicts a flowchart of an example algorithm for resetting stored data related to a first monitored vehicle drive parameter based on detecting the start of the pick operation, according to embodiments of this disclosure.

In accordance with the method or process of FIG. 12, step 1201 includes the controller 103 monitoring the first vehicle drive parameter during a manual operation of the truck 10 by an operator, i.e., a current manual operation. As described in detail above, the monitored first vehicle drive parameter can be related to acceleration of the truck 10 in a first direction.

Thus, in step 1203, the controller 103 can store data related to the monitored first vehicle drive parameter. In the example of FIG. 5, the stored data can be individual acceleration values of the truck 10 occurring during a manual operation of the truck 10. Furthermore, the stored data can include a calculated value, i.e., maximum acceleration of the truck 10 in the first direction, based on the individual acceleration values that are used in a subsequently occurring semi-automated operation of the truck 10. Thus, the controller 103 is configured to use the stored data for implementing a semi-automated driving operation of the truck 10 that occurs subsequent to the manual operation of the truck 10 referred to in step 1201.

However, if the stored data includes data collected during the current manual operation occurring before a new pick operation commences, then that stored data may not be relevant to a semi-automated operation occurring after that new pick operation is initiated and completed. Accordingly, in step 1205, the controller detects operation of the truck 10 indicative of a start of a pick operation occurring during the current manual operation of the truck 10. Upon detecting the start of the pick operation, the controller 103, in step 1207, can then reset the stored data related to the monitored first vehicle drive parameter. Resetting the stored data can include clearing, or discarding, the stored data collected during the current manual operation of the truck 10 from the start of the current manual operation until detection and start of the new or most recent pick operation.

Once the stored data is reset, then the controller 103 can resume monitoring of the first vehicle drive parameter after resetting the stored data. This newly acquired data related to monitoring of the first drive parameter can then be used for implementing a subsequently occurring semi-automated driving operation of the vehicle.

Figure 13:
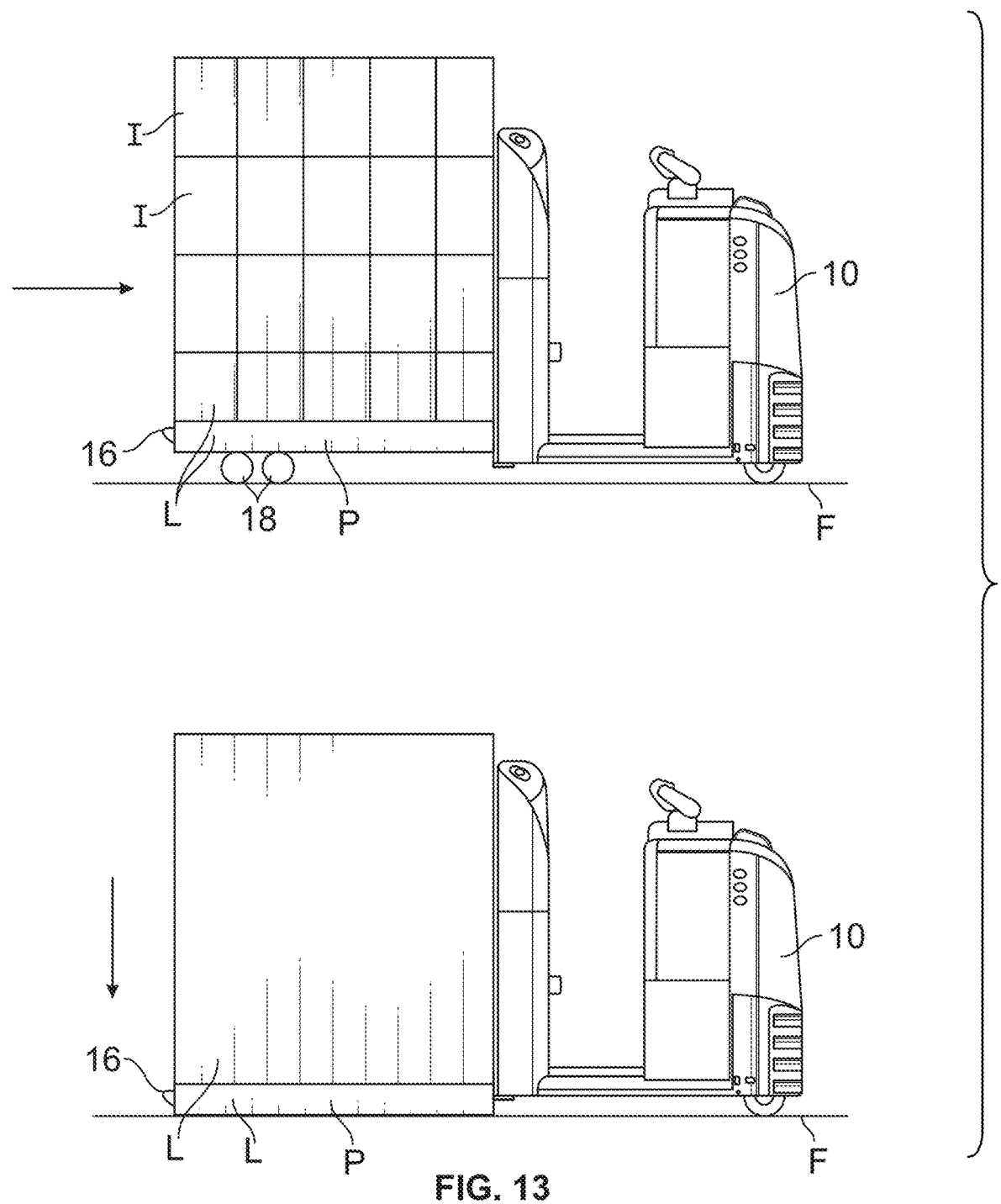
FIG. 13-FIG. 15 depict a sequence of vehicle operations indicative of the start of a pick operation during a manual operation of the vehicle according to one or more embodiments shown and described herein.

In at least one embodiment, the detected operation of the truck 10 indicative of a start of a pick operation comprises detecting a transition from the truck 10 being manually driven with a raised load handling assembly 12 to the truck 10 being stopped with a lowered load handling assembly 12, see FIG. 13. In other words, the controller 103 detects that the truck 10 which was moving by manual operation has now stopped and also that the load handling assembly 12, which was in a raised position, has been lowered. As noted above, the controller 103 can determine if the truck 10 is moving or stopped and the distance that the truck has travelled via signals from the accelerometer 1103 or motor angular velocity signals from the traction controller 106. As also noted above, the controller 103 can determine the height of the load handling assembly 12, i.e., whether the load handling assembly is in a raised position or in a home or lowermost position, relative to ground from signals generated by one or more of height sensors or switches alone or in combination with the load sensor LS. The raised position of the load handling assembly 12 would be any position above the lowermost position. This sequence of operations is particularly indicative of the start of a new pick operation when the raised load handling assembly 12 bears a substantially non-zero load and the lowered load handling assembly 12 bears a substantially zero load. As noted above, the controller 103 can determine the weight of a load on the forks 16 from signals generated by the load sensor LS. In FIG. 13, the forks 16 of the load handling assembly 12 have been lowered so that the pallet P is no longer supported by the forks 16 and, instead, is supported by a floor F or other support surface defining ground. Hence, such a sequence occurs, for example, when the truck 10 transitions from moving with a loaded pallet P to stopping and then lowering its fork 16 completely so that the forks 16 no longer support the loaded pallet P. It is also contemplated that this sequence of operations may be indicative of the start of a new pick operation even when the raised load handling assembly 12 bears either an unloaded pallet or no pallet.

Figure 14:
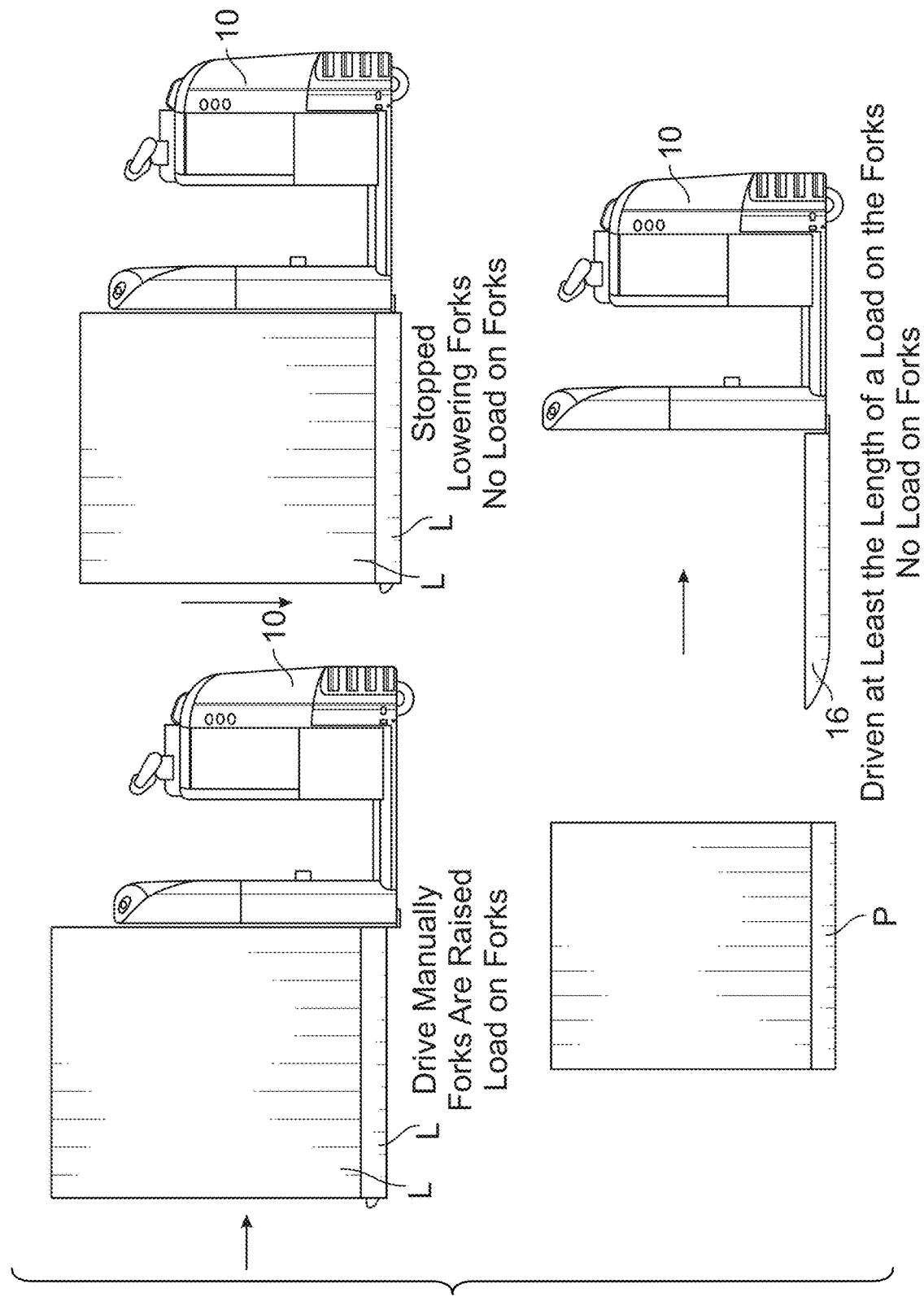
Figure 15:
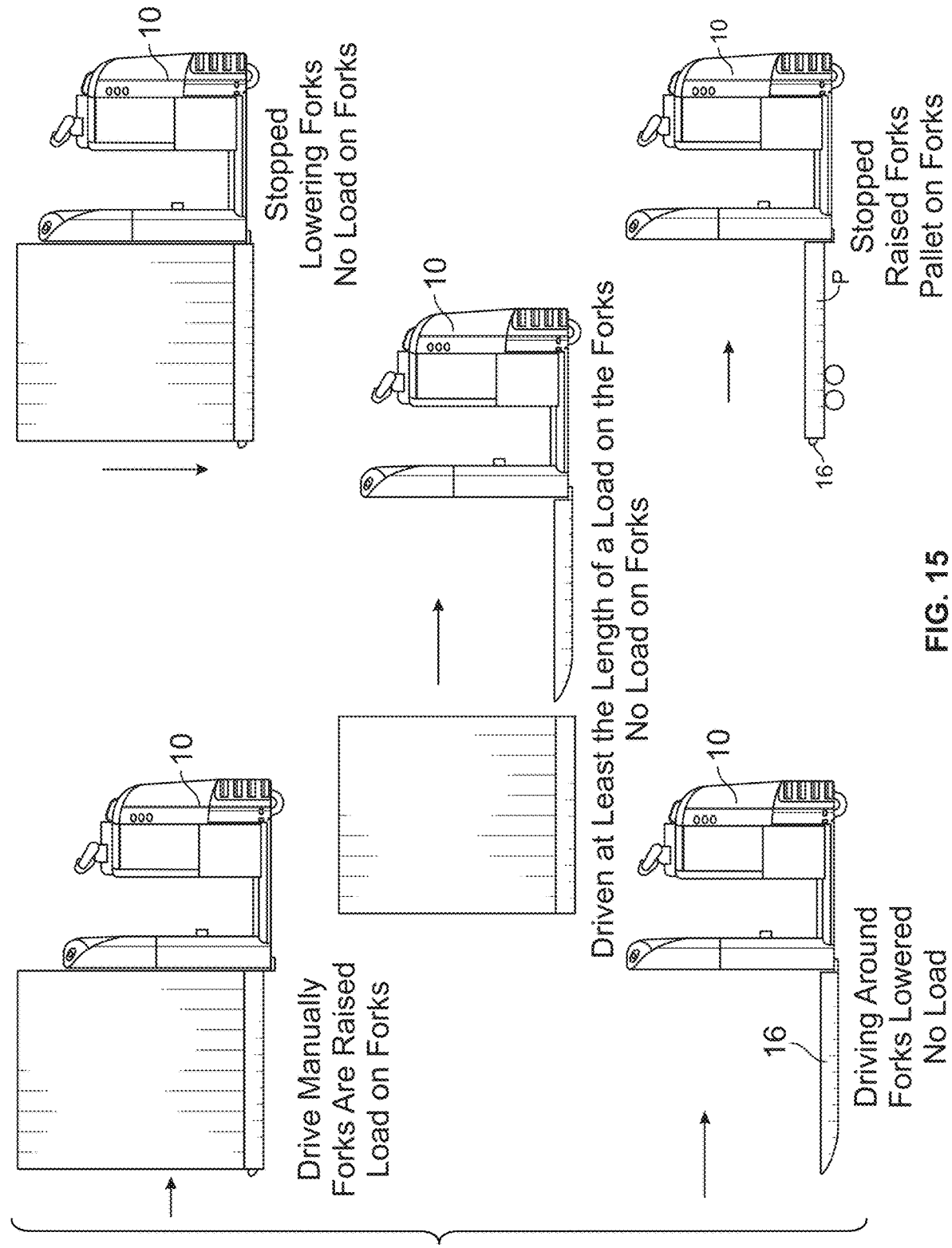

In a further embodiment, the detected operation of the truck 10 indicative of a start of a pick operation comprises detecting the transition from the truck 10 being manually driven with a raised load handling assembly 12 to the truck 10 being stopped with a lowered load handling assembly 12, as illustrated in FIG. 13, and detecting movement of the truck 10 for a distance at least equal to a length of a load L on the forks 16 after the forks 16 are lowered, see FIG. 14. In the FIG. 14 example, the forks 16 have a length only slightly greater than the length of the pallet P. However, it is contemplated that a truck may have forks with an extended length such that the forks can carry concurrently more than one conventionally sized pallet. In such an embodiment, the forks may carry only one pallet at the end of the forks or two or more pallets along the entire length of the forks. For example, a point-laser or an ultrasonic device could be provided in the second end section 14B for sensing a distance from the second end section 14B to a pallet, such as being positioned at the end of the forks. Hence, the truck 10 may move a distance equal to the length of a load L by moving only the length of a single pallet when only a single pallet is provided on the forks or a distance equal to the length of two or more pallets when two or more pallets are provided on the forks. Thus, once the forks 16 are lowered and they are not bearing any load, movement of the truck 10 (without any load on the forks 16) is presumably indicative of the truck 10 off-loading a pallet that it previously had been bearing.

The above sequence of operations is even more indicative of a new pick operation when the detected operation of the truck 10 further comprises determining that the operator drives the truck 10 with the lowered load handling assembly 12 while it is bearing a substantially zero load. Movement of the truck 10 by a distance at least equal to the length of a load carried by the forks is relevant (as noted above) but driving the truck 10 for a distance greater than the length of the forks 16 without a load is even more indicative of commencement of a new pick operation.

In yet a further embodiment, the detected operation of the truck 10 indicative of a start of a pick operation comprises detecting the transition from the truck 10 being manually driven with a raised load handling assembly 12 to the truck 10 being stopped with a lowered load handling assembly 12, as illustrated in FIG. 13, detecting movement of the truck 10 for a distance at least equal to a length of the load L on the forks 16 after the forks 16 are lowered, as illustrated in FIG. 14, determining that the operator has driven the truck 10 with the lowered load handling assembly 12 while it is bearing a substantially zero load, and detecting a transition from the truck 10 moving with the lowered load handling assembly 12 to the truck 10 being stopped with the load handling assembly 12 newly raised. In this instance, the truck 10 has travelled for some distance with essentially an empty and lowered load handling assembly 12 and has now stopped wherein, after stopping, the operator subsequently raises the load handling assembly 12. Especially when the now-raised load handling assembly 12 bears a load less than a predetermined amount but more than a substantially zero load, e.g., the weight of an empty pallet, a roll cage, a freezer box or other special container, this sequence of operations is indicative of the start of a new pick operation. The predetermined amount might comprise the weight of a conventional empty pallet, roll cage, freezer box or other special container plus a margin of error of 1-10% of the weight of the pallet.

In other words, the truck 10 had a substantially non-zero load (i.e., it was carrying a pallet P with items I) and the truck 10 then stopped, lowered the pallet P and the items I on the pallet P, wherein the pallet P and the items I define the load L on the forks 16, and proceeded to move with the lowered load handling assembly 12. In particular, that lowered load handling assembly 12 supported essentially no load whatsoever and, therefore, was bearing a substantially zero load while the truck 10 was moving. Afterwards, the truck 10 stopped and raised the load handling assembly 12 such that the now-raised load handling assembly 12 was bearing a load but the load was less than the predetermined amount. One such example would be when the load handling assembly 12 is bearing merely an empty pallet P such that an operator is about to begin a new picking operation. Under these circumstances, the controller 103 can detect from the load sensor LS that the previously-lowered load handling assembly 12 was empty and bearing a substantially zero load but is now bearing at least the weight of a pallet which is more than the substantially zero load. However, the weight of the pallet P by itself is less than the weight of the pallet in addition to one or more items I on the pallet P; thus the controller 103 determines from signals generated by the load sensor LS that the load handling assembly 12 is bearing a load that is more than the substantially zero load but is less than that of a loaded, or semi-loaded, pallet. Accordingly, when detecting that the now-raised load handling assembly 12 is bearing a load less than a predetermined amount, the controller 103 may be detecting that the load bearing assembly 12 is bearing a load equal to the weight of a conventional empty pallet.

As described above, with respect to step 1207, once the controller 103 detects the start of the pick operation, the controller 103 can then reset the stored data related to the monitored first vehicle drive parameter. Additionally, the stored data can include data related to a monitored second vehicle drive parameter during the manual operation of the truck 10 by the operator, wherein the controller 103 is configured to use the stored data of the monitored first and the second vehicle drive parameter for implementing the semi-automated driving operation of the truck 10 subsequent to the manual operation of the truck 10. Thus, in step 1207, the controller 103 can then reset the stored data related to the monitored first vehicle drive parameter and also the monitored second vehicle drive parameter. Hence, the controller 103 can use Equations 1-5, set out above, and the stored data related to the monitored first and second vehicle drive parameters collected since the most recent picking operation began while ignoring data collected prior to the most recent picking operation to calculate a maximum acceleration in the first direction $a_{x\text{-}wa\text{-}max}$ and a maximum acceleration in the second direction ($a_{y\text{-}wa\text{-}max}$) and from those calculations determine a maximum acceleration max.acc to be used in the first direction during the next semi-automated driving operation.

Figure 16:
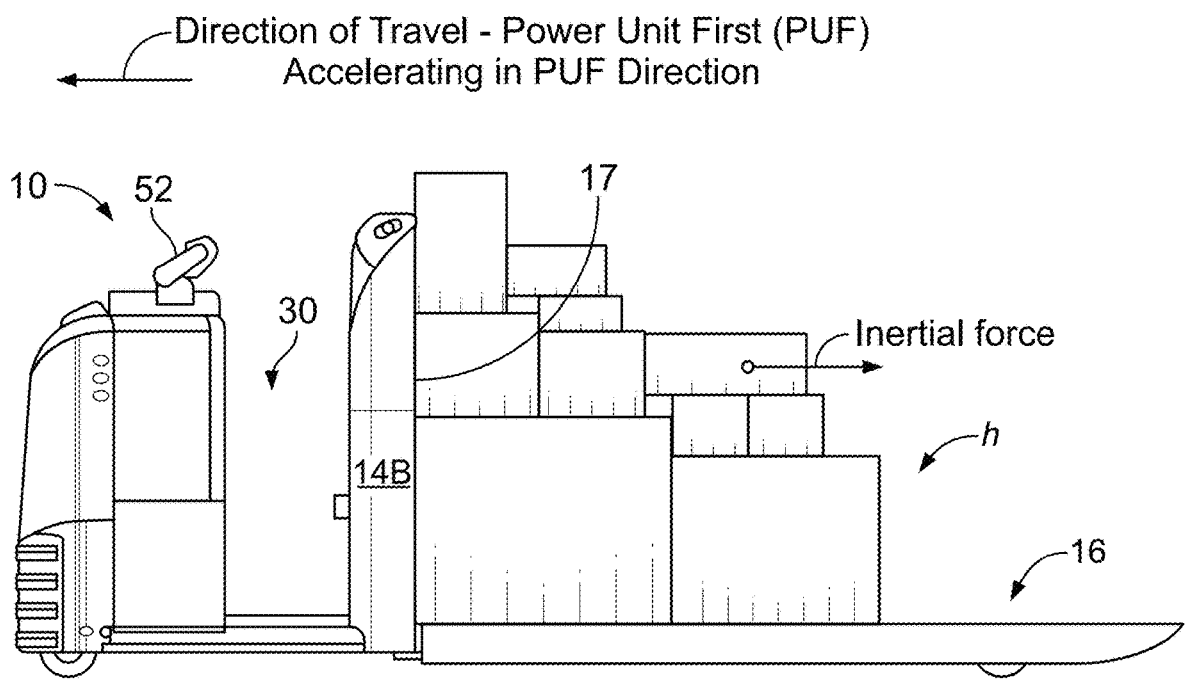
FIGS. 16-19 depict four different orientations in which a vehicle can travel according to one or more embodiments shown and described herein.
Figure 17:
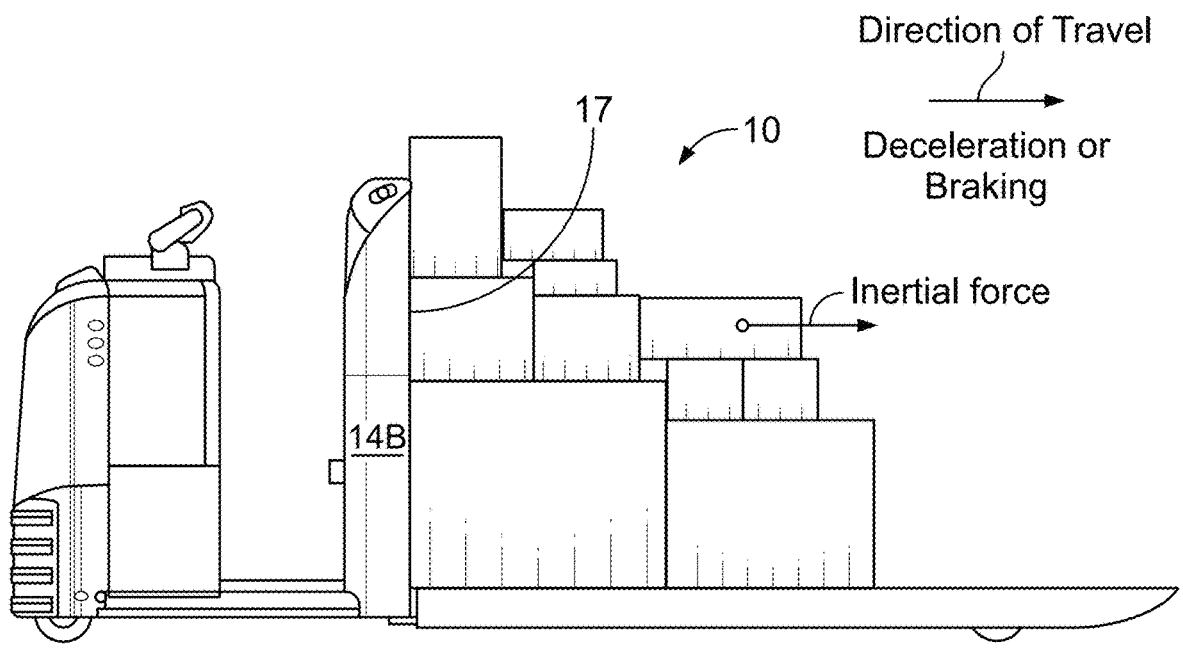
Figure 18:
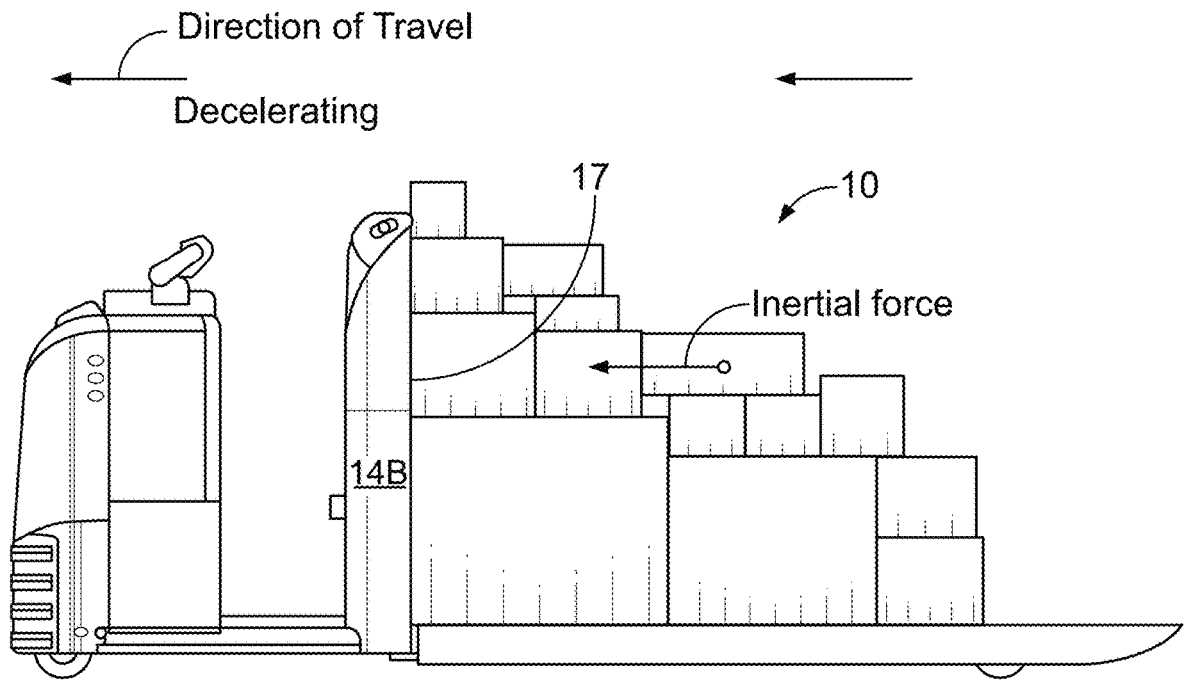
Figure 19:
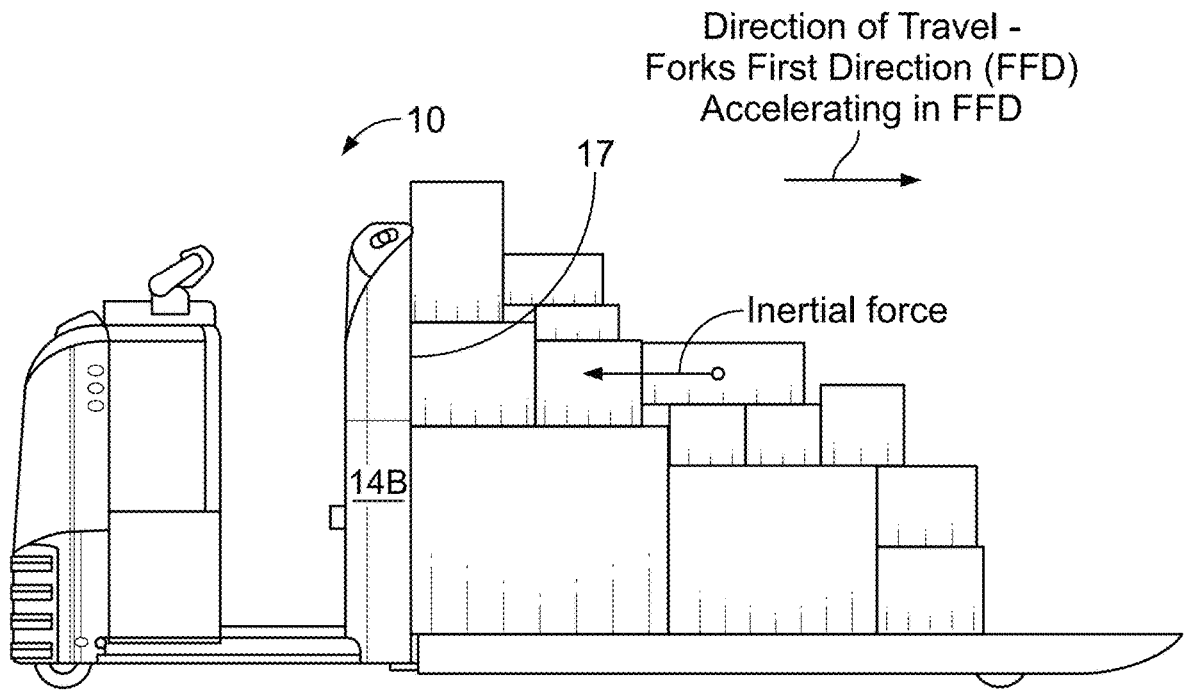

There are four operating conditions of the truck 10 in which it can be considered to travel and function. A first orientation is illustrated in FIG. 16 in which the truck 10 is traveling in a direction with the power unit 14 being "first," wherein the first orientation defines a direction collinear with an axis X, see also FIG. 1A. A first operating condition occurs when the truck is traveling in the direction with the power unit 14 being "first" and the truck 10 is also accelerating (vehicle speed is increasing), see FIG. 16. A second operating condition, illustrated in FIG. 18, occurs when the truck 10 is traveling in the direction with the power unit 14 being "first" and the truck 10 is also decelerating (vehicle speed is decreasing). A second orientation is illustrated in FIG. 17 in which the truck is traveling in a direction with the load handling assembly 12, or forks 16, being "first," wherein the second orientation defines a direction collinear with the X axis, which X axis is generally parallel with the forks 16. A third operating condition occurs when the truck is traveling in the direction with the forks 16 being "first" and the truck 10 is also decelerating (vehicle speed is decreasing), see FIG. 17. A fourth operating condition occurs when the truck 10 is traveling in the direction with the forks 16 being "first" and the truck 10 is also accelerating (vehicle speed is increasing), see FIG. 19.

In each operating condition, the accelerometer 1103 can be configured to sense vehicle drive parameters, e.g., acceleration and deceleration along an axis parallel with the forks 16 or parallel to a direction of travel of the vehicle and an axis orthogonal to the forks 16 or orthogonal to the direction of travel of the vehicle.

As noted above, an operator may stand on the platform 32 within the operator's station 30 of the materials handling vehicle or truck 10 to manually operate the truck, i.e., operate the truck in a manual mode. The operator may steer the truck via a handle 52 and may cause the truck 10 to accelerate via rotation of a travel switch 54 on a control handle 52. Rotation of the travel switch 54 forward and upward will cause the truck to move forward, e.g., in a power unit first (PUF) direction, at an acceleration that may be proportional to the amount of rotation of the travel switch 54, see FIG. 16. Similarly, rotating the travel switch 54 toward the rear and downward of the truck 10 will cause the truck 10 to move in reverse, e.g., forks first (FF) direction, at an acceleration that may be proportional to the amount of rotation of the travel switch 54, see FIG. 19. Rotation of the travel switch 54 forward and upward while the truck 10 is moving in the forks first direction will cause the truck to brake, see FIG. 17. Also, rotating the travel switch 54 toward the rear and downward while the truck 10 is moving in the power unit first direction will cause the truck 10 to brake, see FIG. 18.

Referring back to FIG. 2, the controller 103 may communicate with the receiver 102 and with the traction controller 106, all located on the truck 10, to operate the truck under remote control in response to receiving travel commands from an associated remote control device 70 held by an operator when the operator is positioned off the truck and walking near the truck. Hence, the operator may operate the truck in a remote control mode, or as used herein, "semi-automated mode" or "semi-automated operation," when the operator is not physically present on the truck 10 but is walking near the truck 10 such as during a picking operation, i.e., when the operator is located off the truck 10 and picking or gathering pick items from warehouse storage areas to be loaded on the truck 10, using the remote control device 70 to operate the truck 10 under remote control in a semi-automated operation.

When an operator is using the truck 10, such as during a picking operation within a warehouse, the operator typically uses the truck 10 in both the manual mode and the remote control mode, or the semi-automated operation mode. There can be multiple, distinct manual operations of the truck 10 in-between remote control operations, also referred to herein as semi-automated operations of the truck. Each such manual operation can include lifting a load, lowering a load, and/or driving the truck forwards or backwards and steering.

As noted above, an example control algorithm, or process, for the controller 103 can monitor drive parameters, e.g., acceleration and deceleration, during one or more recent manual operations of the truck 10 to be used in part to calculate a corresponding adaptive drive parameter, e.g., a maximum positive acceleration (speed is increasing), to be used by the controller 103 when the truck 10 is next operated in the remote control mode, in either the power unit first direction or the forks first direction. As also noted above, the controller 103 may comprise one or more accelerometers which may measure physical acceleration of the truck 10 along one, two or three axes, e.g., along the direction of travel of the vehicle and transverse (90 degrees) to, or orthogonal to, the direction of travel of the vehicle. It is also contemplated that the accelerometer 1103 may be separate from the controller 103 but coupled to and in communication with the controller 103 for generating and transmitting to the controller 103 acceleration signals, see FIG. 2.

In accordance with the principles of present embodiments, acceleration data in the direction of travel of the vehicle from one or more prior manual operations of the truck 10 may be collected and stored, wherein only acceleration data in the direction of travel of the vehicle from one or more prior manual operations of the truck 10 when the truck 10 is traveling in the first orientation such as the power unit first direction and accelerating (speed is increasing), see FIG. 16, i.e., the truck is accelerating (speed is increasing) in the first orientation, is used to determine a maximum acceleration value for use in a subsequent remote control operation of the truck 10. In accordance with other embodiments, deceleration data in the direction of travel of the vehicle is collected and stored, wherein only deceleration data in the direction of travel of the vehicle from one or more prior manual operations of the truck 10 when the truck 10 is traveling in the second orientation such as when the truck 10 is traveling in the forks first direction and decelerating (speed is decreasing), see FIG. 17, i.e., the truck is decelerating (speed is decreasing) in the second orientation, is used to determine a maximum acceleration value for use in a subsequent remote control operation of the truck 10. As noted above, the load handling assembly 12 may comprise a back cover 17 defining a load support, see FIG. 1C, that is coupled to and moves with the forks 16, see also FIGS. 16-19. The back cover 17 may be located within or adjacent a recess or pocket 114B of the second end section 14B, such that the back cover 17 may move up and down within the pocket 114B as the load handling assembly 12 is moved vertically up and down, see FIG. 1C. As can be seen in FIGS. 16 and 17, in these two scenarios, the back cover 17 of the load handling assembly 12 does not provide support for a load L being carried on the forks 16, i.e., the back cover 17 does not apply a force to the load L. When the truck 10 is traveling in the power unit first direction and decelerating (speed is decreasing) in the direction of travel of the vehicle, see FIG. 18, or the truck 10 is traveling in the forks first direction and accelerating (speed is increasing) in the direction of travel of the vehicle, see FIG. 19, acceleration and deceleration values in the direction of travel of the vehicle may not be collected and, if collected, are not used in determining a maximum acceleration value to be used in a subsequent remote control operation of the truck 10. In these latter two scenarios, the back cover 17 may support the load L, i.e., may apply a force to the load L. As a result, an operator may operate the truck 10 more aggressively because the load is supported by the back cover 17. If a maximum acceleration value (speed is increasing) for use in a subsequent remote control operation is based, at least in part, on data collected while the truck 10 is traveling in the power unit first direction and decelerating (speed is decreasing) and/or the truck 10 is traveling in the forks first direction and accelerating (speed is increasing), the maximum acceleration value may be skewed and may be too high for use in a subsequent remote operation of the truck 10 when the truck 10 is traveling in the first orientation and accelerating (speed is increasing), see FIG. 16, or when the truck 10 is traveling in the second orientation and decelerating (speed is decreasing), see FIG. 17.

Figure 20:
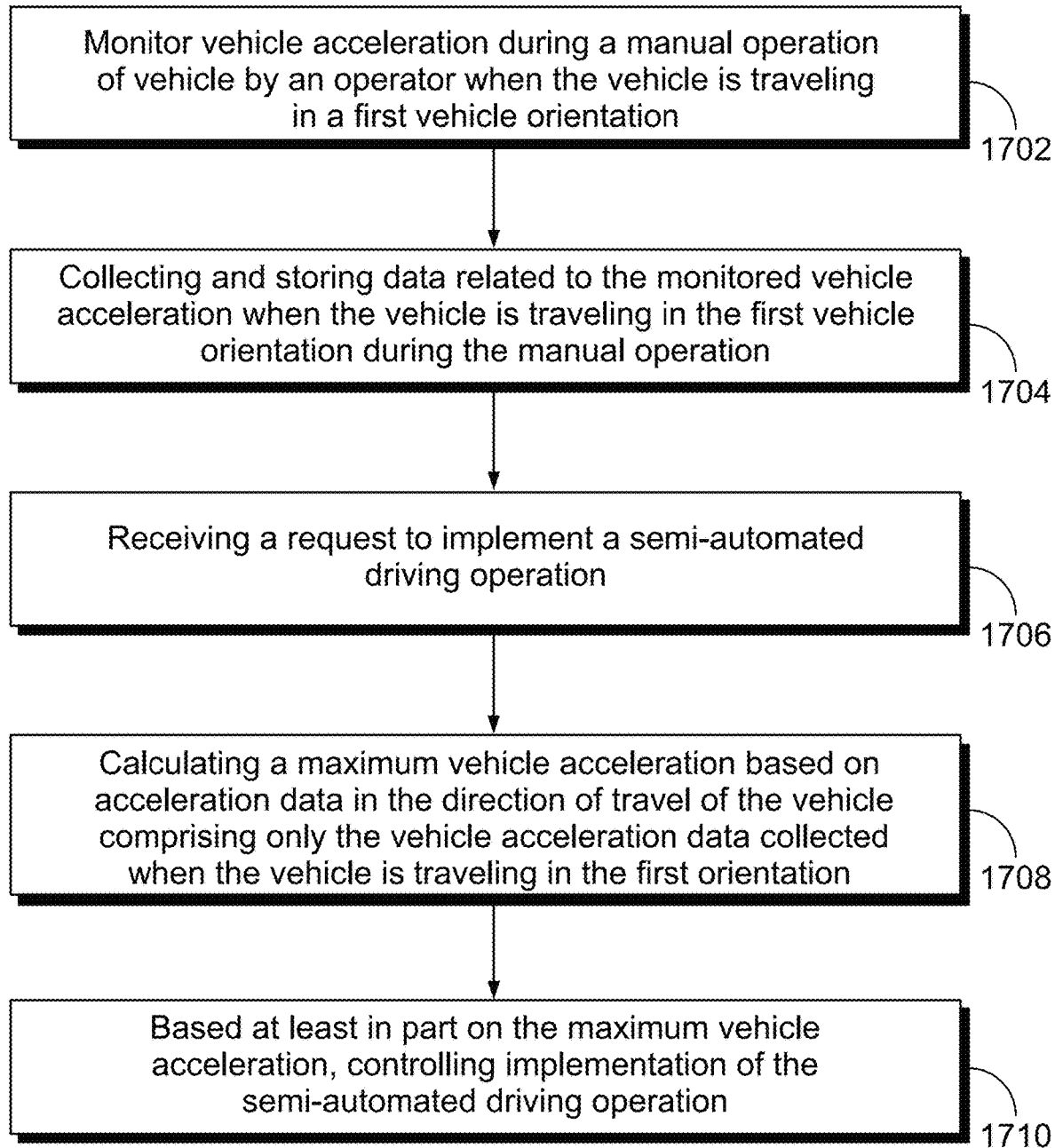
FIG. 20 is a flowchart of an example process for calculating a maximum vehicle acceleration for a semi-automated driving operation according to one or more embodiments shown and described herein.

FIG. 20 is a flowchart of an example process for calculating a maximum vehicle acceleration for a semi-automated driving operation in accordance with embodiments described herein. The process can be implemented using at least a portion of the system illustrated in FIG. 2 such as by controller 103.

In step 1702, the system or process implemented by the controller 103 monitors a first vehicle parameter comprising vehicle acceleration in the direction of travel of the vehicle (vehicle speed is increasing in the direction of travel of the truck 10) during a manual operation by an operator of the vehicle when the vehicle is traveling in the first orientation, which, as noted above, may be the power unit first direction. Similar to the description of step 201 of FIG. 3, a second vehicle drive parameter comprising acceleration of the vehicle along a transverse direction generally 90 degrees to the direction of travel of the truck 10 can also be monitored. The acceleration of the vehicle along the transverse or a second direction may be positive during a right-hand turn and negative during a left-hand turn. Hence, preferably an absolute value of the negative acceleration along with the positive acceleration of the vehicle along the transverse direction may be monitored and used in determining a maximum acceleration to be used by the controller 103 when the truck 10 is next operated in the remote control mode. The second vehicle parameter comprising acceleration (positive and negative) of the vehicle along a transverse direction generally 90 degrees to the direction of travel of the truck 10 may be monitored while the vehicle is traveling and accelerating in the first orientation, the second orientation or both the first and second orientations.

In step 1704, the system or process collects and stores data related to the monitored vehicle acceleration in the direction of travel of the vehicle (i.e., positive acceleration in the direction of travel of the vehicle) comprising data related to the monitored vehicle acceleration when the vehicle is traveling in the first vehicle orientation and accelerating (vehicle speed is increasing) during the manual operation, either alone or in combination with the absolute value of the acceleration (positive and negative) in the transverse direction (second vehicle parameter). The system or process may also collect and store data related to the second vehicle parameter when the vehicle is traveling and accelerating in the second vehicle orientation during manual operation. The stored data is specifically the monitored vehicle acceleration comprising the first and second vehicle parameters when the vehicle is accelerating and traveling in the first vehicle orientation and the second vehicle parameter when the vehicle is accelerating and traveling in the second vehicle orientation during the manual operation. In step 1706, the system or process receives a request to implement a semi-automated driving operation.

In step 1708, the system or process calculates a maximum vehicle acceleration based on acceleration data comprising at least some portions of the stored data. FIGS. 5-11 along with Equations 1-5 described above provide an example technique for calculating a maximum vehicle acceleration based on monitored acceleration data. Hence, the controller 103 may use Equations 1-2 and the stored data related to the monitored first vehicle drive parameter collected when the vehicle is accelerating (speed is increasing) and traveling in the first vehicle orientation during manual operation to calculate a maximum acceleration in the first direction $a_{x\text{-}wa\text{-}max}$, wherein only acceleration values in the direction of travel of the vehicle in the first orientation or power unit first direction are used to calculate the maximum acceleration in the first direction. The controller 103 may also use Equations 3-4 and the stored data related to the monitored second vehicle drive parameter collected when the vehicle is accelerating (speed is increasing) and traveling in the first vehicle orientation, the second vehicle orientation or both the first and second vehicle orientations during manual operation to calculate a maximum acceleration in the transverse or second direction ($a_{y\text{-}wa\text{-}max}$). From those calculations, a maximum acceleration max.acc is determined using Equation 5 to be used when the truck is traveling and accelerating (speed is increasing) in the power unit first direction and may also be used when the truck is traveling and accelerating (speed is increasing) in the forks first direction during the next semi-automated driving operation. In the embodiment described in step 1708, the maximum acceleration value is calculated based only on the monitored first vehicle drive parameter comprising the vehicle positive acceleration (vehicle speed is increasing) when the vehicle is traveling in the first vehicle orientation (and not in the second vehicle orientation) during the manual operation and may also be based on the monitored second vehicle drive parameter comprising acceleration (positive and negative) of the vehicle along the transverse direction when the vehicle is traveling in the first vehicle orientation, the second vehicle orientation or both the first and second vehicle orientations during the manual operation. Deceleration data (vehicle speed is decreasing in the direction of travel of the truck 10) when the vehicle is traveling in the first or the second orientation is not used when calculating the maximum acceleration value in this example.

Ultimately, in step 1710, the process or system controls implementation of the semi-automated driving operation based at least in part on the calculated maximum vehicle acceleration.

Thus, in an embodiment in accordance with the process of FIG. 20 vehicle acceleration data in the direction of travel of the vehicle (vehicle speed is increasing in the direction of travel of the vehicle 10) corresponding to when the vehicle is traveling in the second vehicle orientation, which is substantially 180 degrees different from the first vehicle orientation, is not used by the processor when calculating the maximum acceleration.

As noted above, the vehicle, or truck 10, can include a load handling assembly comprising at least one fork and a load support extending generally transverse to the at least one fork, wherein the load support is adapted to support a load carried by the at least one fork when the vehicle is accelerating while traveling in a second vehicle orientation and decelerating while traveling in the first orientation, wherein the second vehicle orientation is substantially 180 degrees different than the first vehicle orientation. As also noted above, the load support may comprise a back cover 17 coupled to and movable with the forks 16.

Also, the vehicle, or truck 10, can include a load handling assembly and a power unit such that the first vehicle orientation comprises a power unit first direction.

Figure 21:
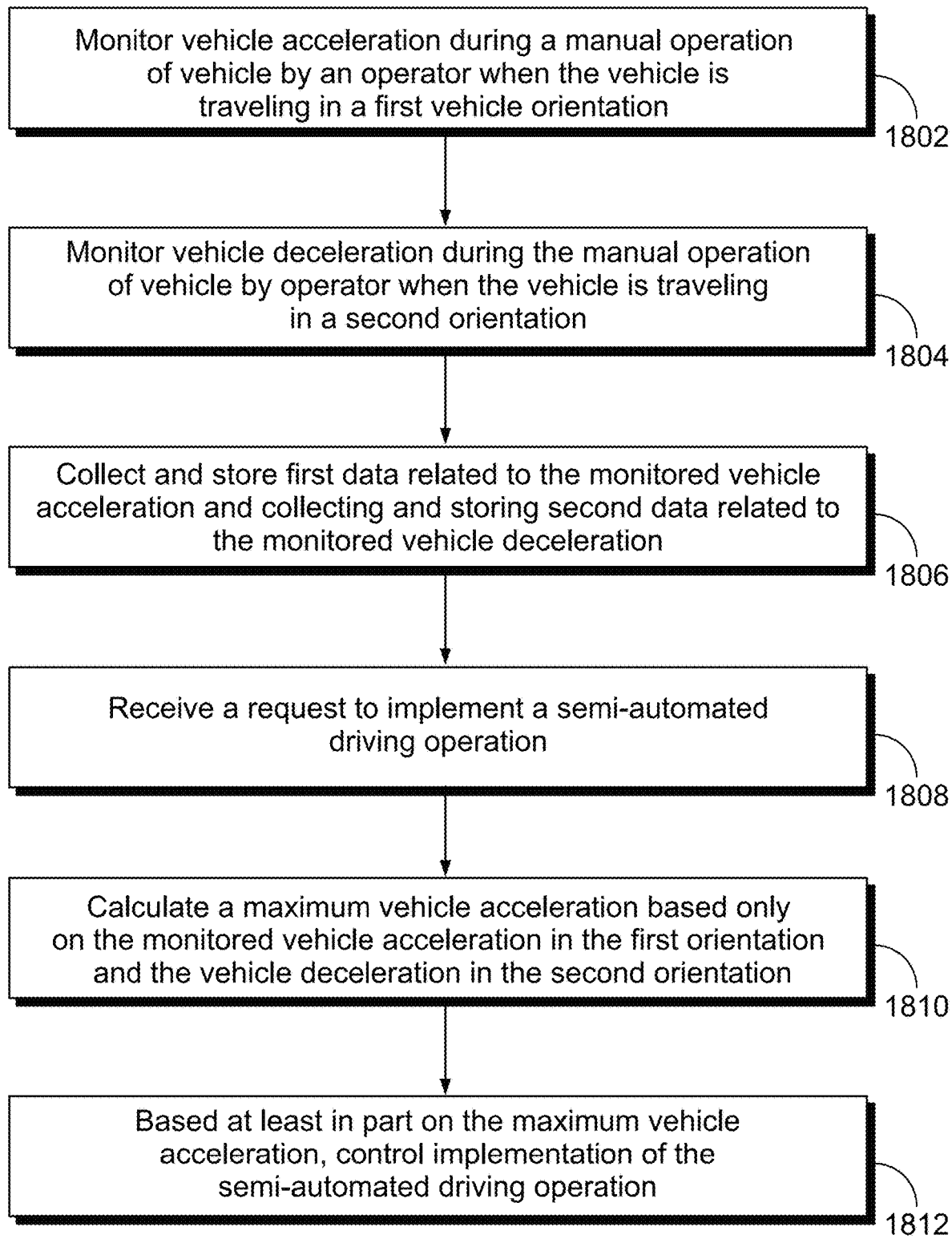
FIG. 21 is a flowchart of an example process for calculating a maximum vehicle acceleration for a semi-automated driving operation according to one or more embodiments shown and described herein.

FIG. 21 is a flowchart of another example process for calculating a maximum vehicle acceleration for a semi-automated driving operation in accordance with embodiments described herein. The process can be implemented using at least a portion of the system illustrated in FIG. 2 such as by controller 103.

In step 1802, the system or process implemented by the controller 103 monitors a first vehicle parameter comprising vehicle acceleration in the direction of travel of the vehicle (vehicle speed is increasing in the direction of travel of the truck 10) during a manual operation by an operator of the vehicle when the vehicle is traveling in the first orientation, which, as noted above, may be the power unit first direction i.e., the vehicle is accelerating (the speed is increasing) in the first orientation. Similar to the description of step 201 of FIG. 3, a second vehicle drive parameter comprising acceleration (positive and negative) of the vehicle along a transverse or second direction 90 degrees to the direction of travel of the truck 10 can be monitored while the vehicle is traveling and accelerating in the first orientation, the second orientation or both the first and second orientations.

In step 1804, the system or process implemented by the controller 103 monitors a further or third vehicle parameter comprising vehicle deceleration in the direction of travel of the vehicle (vehicle speed is decreasing in the direction of travel of the truck 10) during a manual operation by an operator of the vehicle when the vehicle is traveling in the second orientation, which, as noted above, may be in the load handling or forks first direction i.e., the vehicle is decelerating in the second orientation. A still further or fourth vehicle parameter comprising acceleration (positive and negative) of the vehicle in the transverse direction can be monitored while the vehicle is decelerating (vehicle speed is decreasing in the direction of travel of the truck 10) in the first orientation, the second orientation or both the first and second orientations, preferably an absolute value of the acceleration of the vehicle along the transverse direction is monitored.

In step 1806, the system or process implemented by the controller 103 collects and stores data related to the monitored vehicle acceleration in the direction of travel of the vehicle (i.e., positive acceleration in the direction of travel of the vehicle) comprising data related to the monitored vehicle acceleration when the vehicle is traveling in the first vehicle orientation and accelerating (vehicle speed is increasing) during the manual operation, either alone or in combination with the absolute value of the acceleration (positive and negative) in the transverse direction (second vehicle parameter). The system or process may also collect and store data related to the monitored vehicle deceleration in the direction of travel of the vehicle (i.e., deceleration in the direction of travel of the vehicle) comprising data related to the monitored vehicle deceleration when the vehicle is traveling and decelerating in the second orientation, either alone or in combination with the absolute value of the acceleration in the transverse direction (fourth vehicle parameter). The system or process may also collect and store data related to the second vehicle parameter when the vehicle is traveling and accelerating in the second vehicle orientation during manual operation. The system or process may still further collect and store data related to the fourth vehicle parameter when the vehicle is traveling and decelerating in the first vehicle orientation during manual operation. In step 1808, the system or process receives a request to implement a semi-automated driving operation.

In step 1810, the system or process implemented by the controller 103 calculates a maximum vehicle acceleration based on acceleration and deceleration data comprising at least some portions of the stored data. FIGS. 5-11 along with Equations 1-5 described above provide an example technique for calculating a maximum vehicle acceleration based on monitored acceleration and deceleration data. Hence, the controller 103 can use Equations 1-2 and the collected and stored data related to the monitored first vehicle drive parameter collected when the vehicle is accelerating in the direction of travel of the vehicle (speed is increasing) and traveling in the first vehicle orientation and the stored data related to the monitored third vehicle drive parameter collected when the vehicle is decelerating in the direction of travel of the vehicle and traveling in the second vehicle orientation during manual operation to calculate a maximum acceleration in the first direction $a_{x\text{-}wa\text{-}max}$, wherein only acceleration values in the direction of travel of the vehicle in the first orientation or power unit first direction and only the deceleration values (absolute value) in the direction of travel of the vehicle in the second orientation or forks first direction are used to calculate the maximum acceleration in the first direction. The controller 103 may also use Equations 3-4 and the stored data related to the monitored second vehicle drive parameter collected when the vehicle is accelerating (speed is increasing) and traveling in the first orientation, the second orientation or both the first and the second vehicle orientations and the stored data related to the monitored fourth vehicle drive parameter collected when the vehicle is decelerating and traveling in the first orientation, the second orientation or both the first and the second vehicle orientation during manual operation to calculate a maximum acceleration in the transverse or second direction $(a_{y\text{-}wa\text{-}max})$. From those calculations, a maximum acceleration max.acc (speed is increasing) is determined using Equation 5 to be used when the truck is traveling in both the power unit first direction and the forks first direction, during the next remote control or semi-automated driving operation. In the embodiment described in step 1810, the maximum acceleration value is calculated based only on the monitored vehicle acceleration in the direction of travel of the vehicle (speed is increasing) when the vehicle is traveling in the first vehicle orientation and/or monitored vehicle deceleration in the direction of travel of the vehicle when the vehicle is traveling in the second orientation. Acceleration data in the direction of travel of the vehicle when the vehicle is traveling in the second orientation or deceleration data in the direction of travel of the vehicle when the vehicle is traveling in the first orientation are not used when calculating the maximum acceleration value. Because the deceleration data in the direction of travel of the vehicle is a negative acceleration in the second orientation, calculating the maximum vehicle acceleration max.acc to be used when the truck is traveling in both the power unit first direction and the forks first direction during the next semi-automated driving operation is performed using the stored absolute value of the deceleration values collected when the vehicle is traveling in the second orientation. The absolute value of acceleration values (positive and negative) in the transverse direction collected when the vehicle is travelling in the first orientation, the second orientation or both the first and second orientations may also be used as well when calculating the maximum vehicle acceleration max.acc.

Ultimately, in step 1812, the process or system controls implementation of the semi-automated driving operation based at least in part on the calculated maximum vehicle acceleration.

Thus, in an embodiment in accordance with the process of FIG. 21 vehicle acceleration data in the direction of travel of the vehicle (speed is increasing) corresponding to when the vehicle is traveling in a second vehicle orientation, which is substantially 180 degrees different from the first vehicle orientation, is not used by the processor when calculating the maximum acceleration. Also, vehicle deceleration data in the direction of travel of the vehicle corresponding to when the vehicle is traveling in the first vehicle orientation is not used by the processor when calculating the maximum acceleration.

As noted above, the vehicle, or truck 10, can include a load handling assembly comprising at least one fork and the vehicle or truck 10 can also comprise a load support extending generally transverse to the at least one fork, wherein the load support is adapted to support a load carried by the at least one fork when the vehicle is accelerating while traveling in a second vehicle orientation and decelerating while traveling in the first orientation, wherein the second vehicle orientation is substantially 180 degrees different than the first vehicle orientation. As also noted above, the load support may comprise a back cover 17 coupled to and movable with the forks 16.

Figure 22:
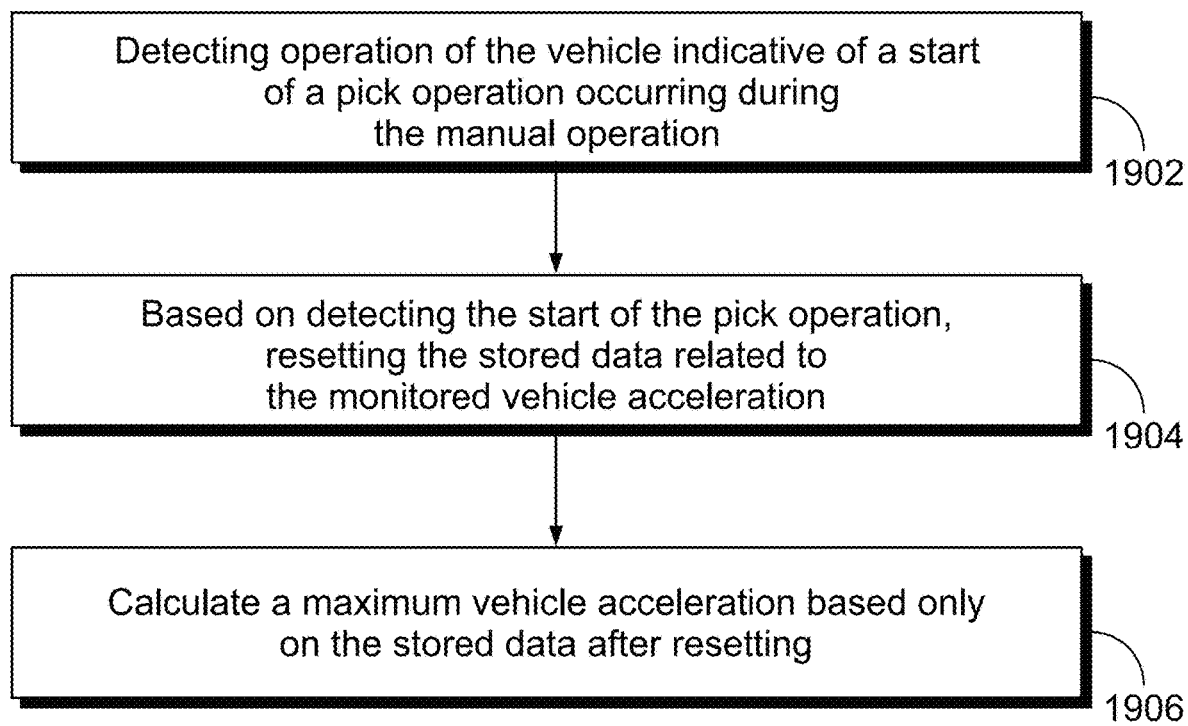
FIG. 22 is a flowchart of an example process for resetting stored acceleration-related data according to one or more embodiments shown and described herein.

FIG. 22 is a flowchart of an example process for resetting stored acceleration/deceleration-related data according to one or more embodiments shown and described herein. The process can be implemented using at least a portion of the system illustrated in FIG. 2 such as by the controller 103 comprising at least one processor 103A.

As mentioned above, it may be beneficial to reset any stored data regarding one or more drive parameters during a current manual mode operation once a start of a new pick operation is detected during the current manual operation. Thus, only data occurring after the start of the new pick operation may be used in calculating a maximum vehicle acceleration for the next occurring semi-automated mode driving operation.

In step 1902, the system or process detects operation of the vehicle indicative of a start of a pick operation occurring during the manual operation of the vehicle. Example techniques are provided above for different techniques for detecting operation of the vehicle indicative of a start of a pick operation occurring during the manual operation of the vehicle. In step 1904, the system or process via the controller 103 comprising one or more processors 103A resets the stored data related to the monitored vehicle acceleration/deceleration based on detecting the start of the pick operation. In the embodiment illustrated with respect to the flowchart of FIG. 20, the stored data comprises the monitored acceleration data in the direction of travel of the vehicle while the vehicle was traveling in the first vehicle orientation. In the embodiment illustrated in FIG. 21, the stored data comprises the monitored acceleration data in the direction of travel of the vehicle while the vehicle was traveling in the first vehicle orientation and the monitored deceleration data in the direction of travel of the vehicle while the vehicle was traveling in the second vehicle orientation.

Step 1906 of the process illustrated in FIG. 22 reflects the result of resetting the stored data prior to performing either step 1702, 1802 or 1804. In other words, the calculation performed in either of steps 1708 or 1810 of a maximum acceleration value will be based only on stored data after the resetting occurs.

U.S. Provisional Patent Application No. 62/892,213, entitled "Adaptive Acceleration for Materials Handling Vehicle," filed on Aug. 27, 2019, is incorporated by reference in its entirety herein. U.S. Provisional Patent Application No. 62/991,206, entitled "Adaptive Acceleration for Materials Handling Vehicle," filed on Mar. 18, 2020, is incorporated by reference in its entirety herein. U.S. Provisional Patent Application No. 62/991,217, entitled "Based on Detected Start of Picking Operation, Resetting Stored Data Related to Monitored Drive Parameter," filed on Mar. 18, 2020, is incorporated by reference in its entirety herein. U.S. patent application Ser. No. 16/943,567, entitled "Adaptive Acceleration for Materials Handling Vehicle," filed on Jul. 30, 2020, is incorporated by reference in its entirety herein. U.S. patent application Ser. No. 17/249,798, entitled "Adaptive Acceleration for Materials Handling Vehicle," filed on Mar. 15, 2021, is incorporated by reference in its entirety herein. U.S. patent application Ser. No. 17/249,799, entitled "Based on Detected Start of Picking Operation, Resetting Stored Data Related to Monitored Drive Parameter," filed on Mar. 15, 2021, is incorporated by reference in its entirety herein.

Having thus described the embodiments of the present application in detail and by reference to embodiments thereof, it will be apparent that modifications and variations are possible without departing from the appended claims.

What is claimed is:

1. A method for operating a materials handling vehicle comprising:
   monitoring, by a processor, vehicle acceleration in a direction of travel of the vehicle during a manual operation by an operator of the vehicle when the vehicle is traveling in a first vehicle orientation;
   collecting and storing, by the processor, data related to the monitored vehicle acceleration in the direction of travel of the vehicle comprising data related to the monitored vehicle acceleration when the vehicle is traveling in the first vehicle orientation during the manual operation;

receiving, by the processor, a request to implement a semi-automated driving operation;

calculating, by the processor, a maximum vehicle acceleration based on acceleration data comprising the stored data, wherein the data related to the monitored vehicle acceleration in the direction of travel of the vehicle used in calculating the maximum vehicle acceleration comprises the vehicle acceleration data in the direction of travel of the vehicle collected when the vehicle is traveling in the first vehicle orientation and wherein vehicle acceleration data in the direction of travel of the vehicle corresponding to when the vehicle is traveling in a second vehicle orientation, which is different from the first vehicle orientation, is not used by the processor when calculating the maximum acceleration; and based at least in part on the maximum vehicle acceleration, controlling, by the processor, implementation of the semi-automated driving operation.

2. The method of claim 1, wherein the second vehicle orientation is substantially 180 degrees different from the first vehicle orientation.

3. The method claim 1, wherein the vehicle comprises a load handling assembly comprising at least one fork and a load support extending generally transverse to the at least one fork, wherein the load support is adapted to support a load carried by the at least one fork when the vehicle is accelerating while traveling in the second orientation and decelerating while traveling in the first orientation.

4. The method of claim 1, wherein the materials handling vehicle comprises a load handling assembly and a power unit, the first orientation comprises a power unit first direction.

5. The method of claim 1, further comprising:

detecting, by the processor, operation of the vehicle indicative of a start of a pick operation occurring during the manual operation of the vehicle; and based on detecting the start of the pick operation, resetting, by the processor, the stored data related to the monitored vehicle acceleration.

6. The method of claim 5, wherein the maximum vehicle acceleration is calculated by the processor based only on the acceleration data collected and stored after the resetting by the processor.

7. The method of claim 1, further comprising:

monitoring vehicle acceleration along a transverse direction to the direction of travel of the vehicle during the manual operation of the vehicle;

collecting and storing data related to the monitored vehicle acceleration in the transverse direction;

when calculating the maximum vehicle acceleration, using the data related to the monitored vehicle acceleration in the transverse direction.

8. A method for operating a materials handling vehicle comprising:

monitoring, by a processor, vehicle acceleration in a direction of travel of the vehicle during a manual operation by an operator of the vehicle when traveling in a first vehicle orientation;

monitoring, by the processor, vehicle deceleration in the direction of travel of the vehicle during the manual operation by the operator of the vehicle when traveling in a second vehicle orientation;

collecting and storing, by the processor, first data related to the monitored vehicle acceleration in the direction of travel of the vehicle comprising data related to the monitored vehicle acceleration when the vehicle is traveling in the first vehicle orientation and second data related to the monitored vehicle deceleration in the direction of travel of the vehicle comprising data related to the monitored vehicle deceleration when the vehicle is traveling in the second vehicle orientation;

receiving, by the processor, a request to implement a semi-automated driving operation;

calculating, by the processor, a maximum vehicle acceleration based on the stored first and second data, wherein the first data related to the monitored vehicle acceleration in the direction of travel of the vehicle used in calculating the maximum vehicle acceleration comprises the vehicle acceleration data in the direction of travel of the vehicle collected when the vehicle is traveling in the first vehicle orientation and wherein the second data related to the monitored vehicle deceleration in the direction of travel of the vehicle used in calculating the maximum vehicle acceleration comprises the vehicle deceleration data collected in the direction of travel of the vehicle when the vehicle is traveling in the second vehicle orientation, and wherein vehicle acceleration data in the direction of travel of the vehicle corresponding to when the vehicle is traveling in the second vehicle orientation, which is different from the first vehicle orientation, is not used by the processor when calculating the maximum acceleration; and based at least in part on the maximum vehicle acceleration, controlling, by the processor, implementation of the semi-automated driving operation.

9. The method of claim 8, wherein vehicle deceleration data in the direction of travel of the vehicle corresponding to when the vehicle is traveling in the first vehicle orientation is not used by the processor when calculating the maximum acceleration.

10. The method claim 8, wherein the vehicle comprises a load handling assembly comprising at least one fork and a load support extending generally transverse to the at least one fork, wherein the load support is adapted to support a load carried by the at least one fork when the vehicle is accelerating while traveling in a second orientation and decelerating while traveling in the first orientation, wherein the second vehicle orientation is substantially 180 degrees different than the first vehicle orientation.

11. The method of claim 8, wherein the materials handling vehicle comprises a load handling assembly and a power unit, the first vehicle orientation comprises a power unit first direction and the second vehicle orientation comprises a load handling assembly first direction.

12. The method of claim 8, further comprising:

detecting, by the processor, operation of the vehicle indicative of a start of a pick operation occurring during the manual operation of the vehicle; and based on detecting the start of the pick operation, resetting, by the processor, the stored first and second data related to the monitored vehicle acceleration and deceleration.

13. The method of claim 12, wherein the maximum vehicle acceleration is calculated by the processor based only on the first and second data stored after the resetting by the processor.

14. A system for operating a materials handling vehicle comprising:
- a memory storing executable instructions; and
- a processor in communication with the memory, wherein execution of the executable instructions by the processor causes the processor to:
  - monitor vehicle acceleration in a direction of travel of the vehicle during a manual operation by an operator of the vehicle when the vehicle is traveling in a first orientation;
  - collect and store data related to the monitored vehicle acceleration in the direction of travel of the vehicle comprising data related to the monitored vehicle acceleration when the vehicle is traveling in the first vehicle orientation during the manual operation;
  - receive a request to implement a semi-automated driving operation;
  - calculate a maximum vehicle acceleration based on acceleration data comprising the stored data, wherein the data related to the monitored vehicle acceleration in the direction of travel of the vehicle used in calculating the maximum vehicle acceleration comprises the vehicle acceleration data in the direction of travel of the vehicle collected when the vehicle is traveling in the first vehicle orientation and wherein vehicle acceleration data in the direction of travel of the vehicle corresponding to when the vehicle is traveling in a second vehicle orientation, which is different from the first vehicle orientation, is not used by the processor when calculating the maximum acceleration; and
  - control implementation of the semi-automated driving operation based at least in part on the maximum vehicle acceleration.

15. The system of claim 14, wherein the second vehicle orientation is substantially 180 degrees different from the first vehicle orientation.

16. The system of claim 14, wherein the vehicle comprises a load handling assembly comprising at least one fork and a load support extending generally transverse to the at least one fork, wherein the load support is adapted to support a load carried by the at least one fork when the vehicle is accelerating while traveling in a second vehicle orientation and decelerating while traveling in the first orientation.

17. The system of claim 14, wherein the materials handling vehicle comprises a load handling assembly and a power unit.

18. The system of claim 17, wherein the first vehicle orientation comprises a power unit first direction.

19. The system of claim 14, wherein execution of the executable instructions by the processor causes the processor to:
- detect operation of the vehicle indicative of a start of a pick operation occurring during the manual operation of the vehicle; and
- reset the stored data related to the monitored vehicle acceleration based on detecting the start of the pick operation.

20. The system of claim 19, wherein execution of the executable instructions by the processor causes the processor to:
- calculate the maximum vehicle acceleration based only on the acceleration data stored after the resetting of the stored data.

21. The system of claim 14, wherein execution of the executable instructions by the processor causes the processor to:
- monitor vehicle acceleration along a transverse direction to the direction of travel of the vehicle during the manual operation of the vehicle;
- collect and store data related to the monitored vehicle acceleration in the transverse direction;
  - when calculating the maximum vehicle acceleration, using the data related to the monitored vehicle acceleration in the transverse direction.

22. The system of claim 21, wherein the vehicle acceleration along the transverse direction is monitored when the vehicle is traveling in the first orientation and a second vehicle orientation, which is substantially 180 degrees different from the first vehicle orientation.

23. A system for operating a materials handling vehicle comprising:
- a memory storing executable instructions; and
- a processor in communication with the memory, wherein execution of the executable instructions by the processor causes the processor to:
  - monitor vehicle acceleration in a direction of travel of the vehicle during a manual operation by an operator of the vehicle when traveling in a first vehicle orientation;
  - monitor vehicle deceleration in the direction of travel of the vehicle during the manual operation by the operator of the vehicle when traveling in a second vehicle orientation;
  - collect and store first data related to the monitored vehicle acceleration in the direction of travel of the vehicle comprising data related to the monitored vehicle acceleration when the vehicle is traveling in the first vehicle orientation and second data related to the monitored vehicle deceleration in the direction of travel of the vehicle comprising data related to the monitored vehicle deceleration when the vehicle is traveling in the second vehicle orientation;
  - receive a request to implement a semi-automated driving operation;
  - calculate a maximum vehicle acceleration based on the stored first and second data, wherein the first data related to the monitored vehicle acceleration in the direction of travel of the vehicle used in calculating the maximum vehicle acceleration comprises the vehicle acceleration data collected when the vehicle is traveling in the first vehicle orientation and wherein the second data related to the monitored vehicle deceleration in the direction of travel of the vehicle used in calculating the maximum vehicle acceleration comprises the vehicle deceleration data collected when the vehicle is traveling in the second vehicle orientation, and wherein vehicle acceleration data in the direction of travel of the vehicle corresponding to when the vehicle is traveling in the second vehicle orientation is not used by the processor when calculating the maximum acceleration; and
  - control implementation of the semi-automated driving operation based at least in part on the maximum vehicle acceleration.

24. The system of claim 23, wherein vehicle deceleration data in the direction of travel of the vehicle corresponding to when the vehicle is traveling in the first vehicle orientation is not used by the processor when calculating the maximum acceleration.

25. The system of claim 23, wherein the vehicle comprises a load handling assembly comprising at least one fork and a load support extending generally transverse to the at least one fork, wherein the load support is adapted to support a load carried by the at least one fork when the vehicle is accelerating while traveling in a second orientation and decelerating while traveling in the first orientation.

26. The system of claim 23, wherein the materials handling vehicle comprises a load handling assembly and a power unit.

27. The system of claim 26, wherein the first vehicle orientation comprises a power unit first direction and the second vehicle orientation comprises a load handling assembly first direction.

28. The system of claim 23, further comprising:
detecting, by the processor, operation of the vehicle indicative of a start of a pick operation occurring during the manual operation of the vehicle; and
based on detecting the start of the pick operation, resetting, by the processor, the stored first and second data related to the monitored vehicle acceleration.

29. The system of claim 28, wherein the maximum vehicle acceleration is calculated by the processor based only on the first and second data stored after the resetting by the processor.

30. The system of claim 23, wherein the second vehicle orientation is substantially 180 degrees different from the first vehicle orientation.

31. The method of claim 1, further comprising:
monitoring, by the processor, vehicle deceleration in the direction of travel of the vehicle during the manual operation by the operator of the vehicle when traveling in a second vehicle orientation;
wherein the collected and stored data related to the monitored vehicle acceleration in the direction of travel of the vehicle comprising data related to the monitored vehicle acceleration when the vehicle is traveling in the first vehicle orientation during the manual operation comprises first data;
collecting and storing, by the processor, second data related to the monitored vehicle deceleration in the direction of travel of the vehicle comprising data related to the monitored vehicle deceleration when the vehicle is traveling in the second vehicle orientation;
wherein calculating, by the processor, a maximum vehicle acceleration comprises calculating, by the processor, the maximum vehicle acceleration based on the stored first data and the stored second data, and wherein vehicle acceleration data in the direction of travel of the vehicle corresponding to when the vehicle is traveling in the second vehicle orientation, which is different from the first vehicle orientation, is not used by the processor when calculating the maximum acceleration.

* * * * *